United States Patent [19]

Ashmore

[11] Patent Number: 5,123,587
[45] Date of Patent: Jun. 23, 1992

[54] METHOD AND APPARATUS FOR MAKING STEEL JOISTS

[75] Inventor: Gregory J. Ashmore, Ovid, Mich.

[73] Assignee: Owen Joist Corporation, Cayce, S.C.

[21] Appl. No.: 714,009

[22] Filed: Jun. 11, 1991

[51] Int. Cl.⁵ .............................................. B23K 31/02
[52] U.S. Cl. ..................................... 228/170; 228/182;
228/5.1; 228/6.1; 29/897.31
[58] Field of Search ............... 228/102, 170, 182, 212,
228/213, 5.1, 6.1, 9; 29/897.31

[56] References Cited

U.S. PATENT DOCUMENTS

| | | | |
|---|---|---|---|
| 3,358,348 | 12/1967 | McGlinchey . | |
| 3,639,962 | 2/1972 | Gooder | 29/897.31 |
| 4,015,396 | 4/1977 | Butts et al. | 29/897.31 |
| 4,414,787 | 11/1983 | Kappen | 52/643 |
| 4,601,152 | 7/1986 | Coppa | 52/637 |
| 4,616,453 | 10/1986 | Sheppard | 52/639 |
| 4,621,475 | 11/1986 | McClain | 52/693 |
| 4,680,912 | 7/1987 | Pantalone | 52/693 |
| 4,748,786 | 6/1988 | Hannah | 52/694 |
| 4,781,009 | 11/1988 | Jonsson | 52/693 |
| 4,813,813 | 3/1989 | Yamamoto | 52/742 |
| 4,829,739 | 5/1989 | Coppa | 52/693 |
| 4,836,436 | 6/1989 | Hannah | 228/182 |
| 4,887,406 | 12/1989 | Saia | 52/694 |
| 4,937,997 | 7/1990 | Thomas | 52/693 |

FOREIGN PATENT DOCUMENTS

| | | |
|---|---|---|
| 1814586 | 12/1968 | Austria . |
| 483543 | 5/1952 | Canada . |
| 40-21127 | 9/1965 | Japan . |

Primary Examiner—Samuel M. Heinrich
Attorney, Agent, or Firm—Shefte, Pinckney & Sawyer

[57] ABSTRACT

The present invention provides a method and apparatus for making joists. The chord members of the joists consist of two pairs of spaced apart angle irons, and the web portion of the joists consist of a plurality of linear metal bar lengths. Under a computerized control, the pairs of angle irons are spaced from one another by a predetermined distance depending on the design characteristics of the joist to be made, and the metal bar lengths are individually selected and cut to provide a metal bar having a specified diameter and a specified length, after which each of the metal bars is selectively positioned, in sequence, between the two pairs of angle irons, and then each end of each metal bar is automatically welded to the angle irons in a predetermined sequence.

25 Claims, 19 Drawing Sheets

METHOD AND APPARATUS FOR MAKING STEEL JOISTS

BACKGROUND OF THE INVENTION

For many years, joists have been a fundamental component of the construction industry, and they have a wide variety of forms depending on their particular load bearing application, such as supporting floor and roof systems.

In its most common form, a joist consists generally of two longitudinally extending chord members spaced from one another and interconnected by a web that extends between the chord members. In joists of this type which are intended for use over short spaces (e.g., up to sixty feet), the web of the joists is most frequently formed of a plurality of lengths of round steel bars which are bent into a predetermined serpentine or sinuous shape, and each such length is then welded to the top and bottom chord members at the several points where the apexes of the upper and lower curved portions of the web abut the top and bottom chord members. Again, in their most common form, each of the top and bottom chord members are formed of two spaced angle irons and the apexes of the curved portions of the sinuous web pieces are positioned between the spaced, flat wall portions of each pair of angle irons and welded thereto by one of several well-known welding techniques, usually gas shielded or flux cored welding.

Short span joists of this type are usually made by what is essentially a manual welding operation because the use of lengths of curved web pieces in the joists does not lend itself to more fully automated welding procedures. More specifically, the web piece is typically between four and six feet in length, and its sinuous curvature is such that the desired spacing between adjacent apexes is typically twenty-four inches, whereby it must be welded to the top chord member at a position along its length spaced every twenty-four inches, and the same welding must also be done at the same spacing along the bottom chord member. However, because of the inherent "spring back" in the sinuous curvature of the steel web pieces, the desired twenty-four inch spacing is not obtained on a consistently exact basis. This variation is acceptable in joists and is readily accommodated in a manual welding operation where the welding technician can position the welding equipment at whatever point the apex of the web piece abuts the chord members. However, in automatic welding operations, the welding equipment is generally fixed in position, and the significant variations caused by the aforesaid "spring back" can result in an automatic weld being made at a point where there is little or no abutment between web piece and the chord member.

The most common manual joist making machine operation for short span joists consists of using a jig for the chord member to properly locate the two pairs of angle irons in spaced relation to one another, and all of the sinuous lengths of the web material are individually laid into the jig manually so that the apexes of the web pieces are disposed between the top and bottom angle irons, and clamps are used to hold the web pieces to the angle irons at each point of abutment. In some of these joists the end portion may also be formed of one or two linear round metal bars which are also manually placed between the chord members at both ends thereof, adjacent the sinuous web portions and then clamped in place thereat. The assembled joist is then removed from the jig and taken from the assembly area to a welding area where welds are made at each point of abutment. In most long span joists, a similar manual forming operation is used, but the web may be made up of a plurality of linear lengths of angle iron which have both end portions crimped to reduce their width so that they will fit within the spacing (e.g., one inch) between the angle irons of the two chord members before they are manually welded to the angle irons.

In the past, it is also known that joists could be manually formed using two spaced pieces of wood as the chord members, and using a plurality of individual metal tubes as the webbing, these metal tubes having their end flattened and being arranged in an alternating "V" and inverted "V" pattern with the one flattened end of each adjacent tube overlapping that of an adjacent tube and being fixed to the wooden chord member by connecting rods inserted through the chord member and the overlapping end portion.

Forming joists by what is essentially a manual welding operation is time consuming and, more importantly perhaps, requires significant labor costs, particularly as to the costs of skilled welding technicians. Another disadvantage that can result from the use of sinuous lengths of web material in manual operations is that excess material, and therefore increased costs, is utilized even though it is not needed. In some joist designs, strength requirements dictate that the compression member in the web must be larger than the tension member, so when a sinuous web piece is used the steel bar stock from which it is made must be of a sufficient size to meet the strength requirements of the compression member portion, and since the web piece is made of a continuous piece of the steel bar stock having a constant diameter along its length, the tension member portion of the web piece is of a size greater than that required for its load bearing function.

The present invention provides a method and apparatus for automatically making a joist which overcomes the aforesaid drawbacks of known technology for making joists, and which provides a number of practical and commercial advantages.

SUMMARY OF THE INVENTION

The present invention is directed to a method and apparatus for making steel joists which consist of two spaced chord members interconnected by metal bars forming a web therebetween, such method and apparatus including an arrangement for delivering a plurality of substantially linear metal bars of predetermined lengths to an assembly station, and also delivering two substantially linear chord members of predetermined lengths to such assembly station, the chord member delivery arrangement also being utilized for positioning the chord members in spaced relation to one another at the assembly station. An arrangement is also provided for grasping and manipulating the metal bars in a predetermined sequence so that one metal bar at a time is located between the spaced chord members with each end of each metal bar being disposed in abutting relationship with a different one of the chord members, and the ends of each such metal bar are welded automatically to the chord members at the point of abutment therebetween.

In the preferred embodiment of the present invention, each of the chord members consists of a pair of angle irons which are positioned at the assembly station so that one corresponding flat wall portion of each angle iron in each pair is arranged in spaced parallel relation to the corresponding flat wall portion of the other angle iron in that pair, and the metal bars are manipulated so that each end thereof is disposed between the spaced wall portions of the angle irons in each pair for subsequent welding thereat. Also, the metal bars are manipulated in a predetermined sequence so that one metal bar which is positioned between the aforesaid spaced wall portions of the pairs of angle irons is welded to only one angle iron in each such pair, then the next metal bar is positioned between the pairs of angle irons, and, then, the first metal bar is welded to the other two angle irons in each said pair to complete the weld for that metal bar.

Also, in the preferred embodiment of the present invention, an arrangement is provided for automatically forming the metal bars into their predetermined lengths by advancing a stock piece of metal bar beyond a fixed reference point for a distance corresponding to the predetermined length of a particular metal bar, and then cutting the stock piece at the reference point. Additionally, this arrangement preferably includes a plurality of forming stations with each station having its own feeder and cutter, and each station feeds and cuts a stock piece having a different diameter.

The angle irons in each pair are preferably engaged separately, and are selectively movable toward and away from one another between a first position at which the spacing therebetween is greater than the diameter of the metal bar to be positioned therebetween, and a second position at which the angle irons are moved toward one another to press the flat wall portions thereof into firm abutment with the ends of the metal bar for subsequent welding thereto.

The arrangement for grasping and manipulating the metal bars preferably includes a device that is rotatable about an axis of rotation generally perpendicular to the plane containing the two chord members, and this device is provided with arms for releasably grasping the metal bars and is rotatable to selectively position the grasped metal bars at any one of a plurality of different angular relationships with respect to the chord members, whereby each metal bar can be located between the chord members at any given angle that is required for the design of the particular joist being made. Also, the arms are preferably spaced from one another to grasp the metal bar at spaced locations, and the arms are selectively movable toward and away from one another to permit the arms to properly hold metal bars of different lengths.

The arrangement for welding the metal bars to the chord members preferably includes a welding tip which is mounted on a mounting arrangement movable toward and away from the ends of the metal bars when they are disposed between the chord members to permit the welding tip to be selectively moved to a position for engaging the end of the metal bar to form the weld thereat, and this arrangement also preferably includes a position sensor mounted on the aforesaid mounting means for movement therewith, the sensor being movable with respect to the mounting arrangement toward and away from the ends of the metal bar for generating a signal which is a function of the relative positions between the end of the metal bar and the mounting arrangement.

DESCRIPTION OF THE PREFERRED EMBODIMENT

Figure 1:
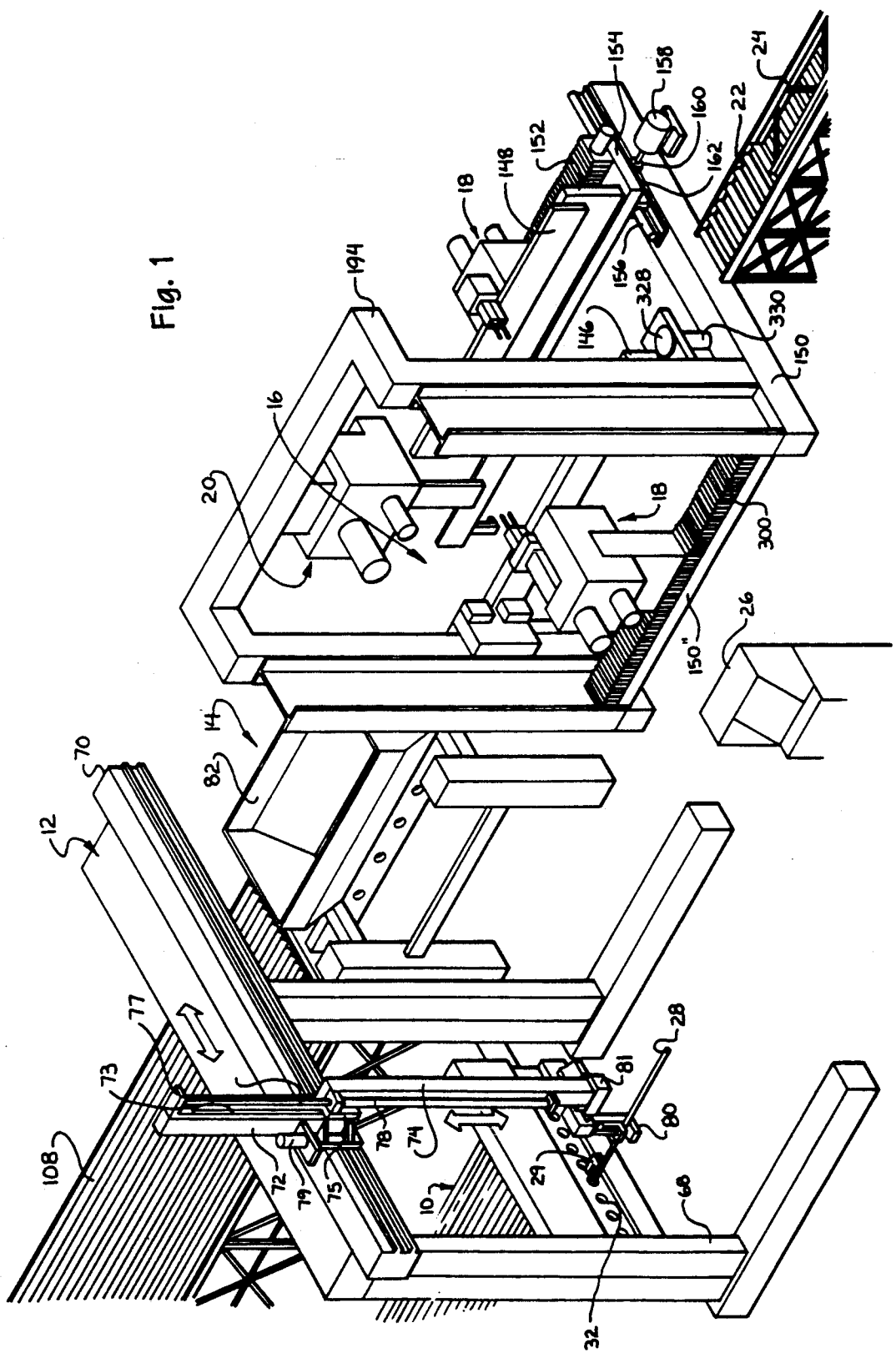
FIG. 1 is an overall layout view of the apparatus of the present invention.

Looking now in greater detail at the accompanying drawings, FIG. 1 is a perspective view illustrating the preferred embodiment of the apparatus for forming steel joists in accordance with the present invention, some of the details of the various components of the apparatus being omitted for clarity of overall illustration of the apparatus. The apparatus consists of a number of different operations which take place in a predetermined sequence, each of these operations being generally formed at different stations as described in greater detail below and which may be generally characterized as a metal bar cutting station 10, a metal bar transfer station 12, a metal bar and chord member advancing station 14, and an assembly station 16 which includes welding apparatus 18 and an arrangement 20 for grasping and manipulating metal bars at the assembly station 16. A roller-type conveyor 22 is also provided for transporting finished joists 24 away from the apparatus, and a control panel 26 which is diagrammatically illustrated in FIG. 1 is electrically connected to all of the various operating components of the apparatus by suitable electrical wires (not shown). The control panel 26 includes a conventional central processing unit (CPU) which may be of any conventional type that can be programmed to control the various operations of the apparatus in a predetermined and programmable sequence, such as an IBM AT computer sold by International Business Machines Corporation in Armonk, N.Y.

Figure 2:
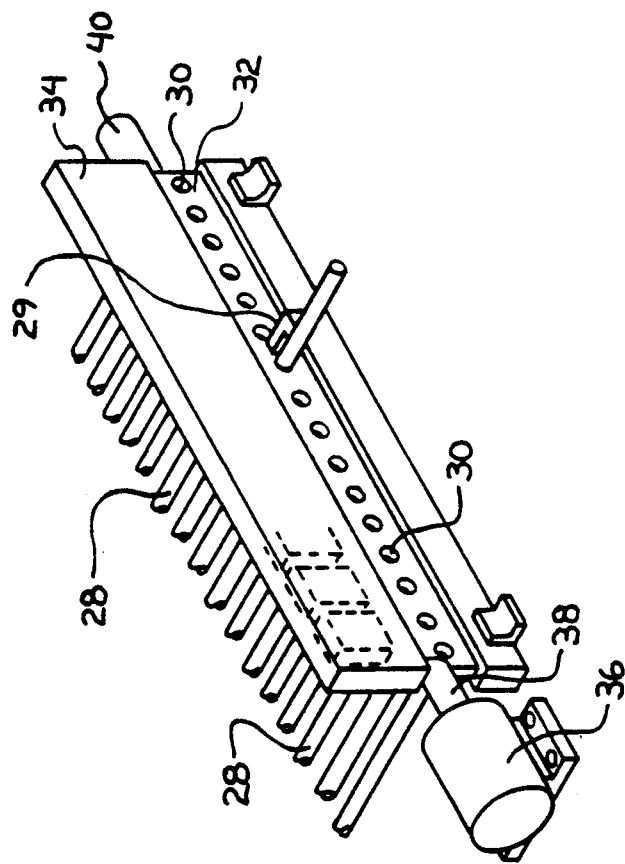
FIG. 2 is a perspective view of a mechanism for cutting stock pieces of metal bars into predetermined lengths.
Figure 3:
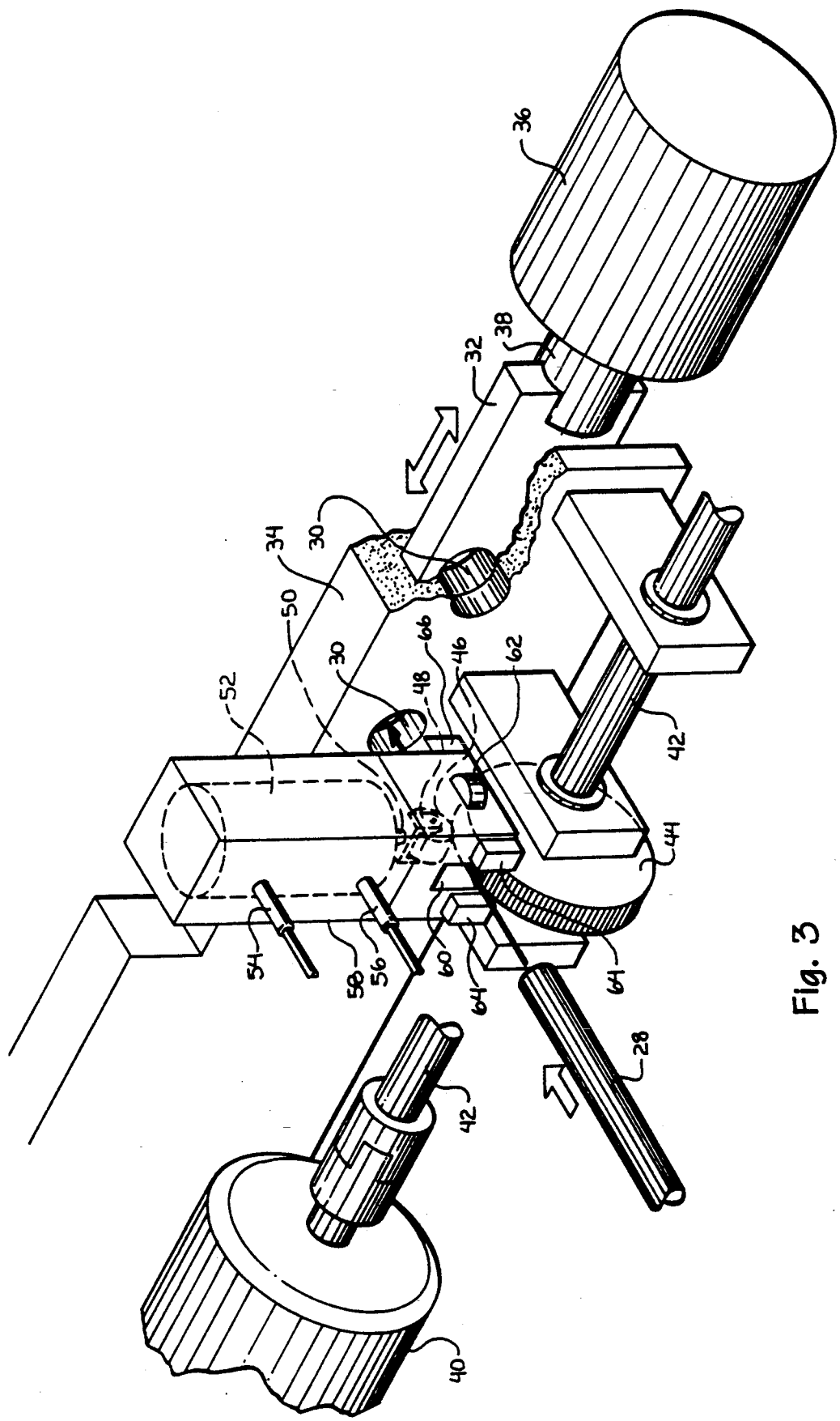
FIG. 3 is a detailed view of the device illustrated in FIG. 2.

The apparatus at the cutting station 10 is shown in greater detail in FIGS. 2 and 3. The apparatus is generally shown in FIG. 2 to include a plurality of locations at which individual metal bars 28 are cut to length, and the particular arrangement shown in FIG. 2 provides for cutting sixteen metal bar stocks 28 but a different number of cutters could be provided, if desired. Each of the sixteen different metal bar stocks 28 will generally be round bars, each having a different diameter, and each metal bar stock 28 is located adjacent a different opening 30 in the cutting block 32 which is moved laterally in a housing 34 by a hydraulic cylinder 36 operating through a connecting shaft 38. To assist in forming a clean cut of the metal bars 28, a support plate 29 is provided adjacent each opening 30 in the cutting block 32 (only one support plate 29 being shown in FIGS. 1 and 2), each support plate 29 acting to support the portion of the metal bar 28 immediately adjacent the opening 30 during shearing movement of the cutting block 32 whereby such shearing movement does not cause any significant bending or distortion of the metal bar 28.

In FIG. 3, only one of the advancing and cutting arrangements is shown, but it will be understood that an identical arrangement is provided at each of the sixteen openings in the cutting block 32. A motor 40 rotates a common drive shaft 42 that extends horizontally behind the housing 34, and at each of the openings 30 a drive wheel 44 is rotatably carried on the drive shaft 42 so that it is disposed directly beneath a pressure roller 46 rotatably mounted in an inverted U-shaped bracket 48 that is connected to the piston rod 50 extending from an air cylinder 52 having inlet and outlet conduits 54, 56, the air cylinder 52 operating in the conventional manner to raise and lower the housing 48 and the pressure roller 46 under the control of the CPU as described below. The air cylinder 52 is mounted in a housing subassembly 58 which is formed with a passageway 60 that extends horizontally in a direction towards each of the openings 30 so that one of the metal bar stocks 28 can extend therethrough, between the drive wheel 44 and the pressure roller 46. The housing subassembly 58 may also include two side rollers 62, only one of which is shown in FIG. 3, for engaging the sides of the metal bar stock 28 when it is inserted in the passageway 60 to provide guidance and support for the metal bar stock 28 as it moves through the passageway 60. A pair of opposed and conventional sensors 64, which may be of any well known type, are mounted on the housing subassembly 58 at the front end of the passageway 60, and an identical pair of opposed sensors are mounted on the housing subassembly 58 at the rear end of the passageway 60, the sensors 64 and 66 each generating a signal which is transferred to the CPU each time the end of the metal bar stock 28 breaks the plane of the beam extending between the respective pairs of sensors 64, 66.

The operation of the above-described cutting station is as follows. At each of the openings 30, a metal bar stock having a different diameter is manually inserted into the passageway 60 so that it extends between the drive wheel 44 and the pressure roller 56 (which is located at its raised position by the air cylinder 52), and between the side rollers 62, with the front end of the metal bar stock 28 disposed just beyond the innermost sensors 66. The interruption of the beam between the sensors 64 and 66 by the metal bar stock 28 sends a signal to the control panel 26 to indicate that a length of metal bar stock 28 is in place, and, as indicated above, the CPU in the control panel 26 is programmed to determined which of the sixteen different metal bar stocks 28 is to be cut, and the particular length which the cut piece is to have, both of which will depend on the design of the particular joist being made. The control panel 26 then sends an appropriate signal to the desired station at which the correct size of metal bar stock 28 is located, and the air cylinder 52 is operated to lower the pressure roller 56 into contact with the top surface of the metal bar stock 28 so that it is firmly held between the pressure roller 46 and the drive wheel 44, and the motor 40 is operated, initially, to turn the shaft 42 and the drive wheel 44 in a reverse direction so that the metal bar stock 28 is withdrawn through the passageway 60 until the leading end of the metal bar stock 28 no longer breaks the beam of the innermost sensor 66, whereupon the motor 40 stops so that the lead end of the metal bar stock 28 is then located essentially at the plane of the beam of the sensor 66 which provides a reference point that is fixed with relation to the cutting block 32. The motor 40 is then operated in a reverse direction and the drive wheel 44 advances the metal bar stock through the passageway 60 and through the adjacent opening 30 in the cutting block 32 so that the metal bar stock 28 is advanced outwardly from the aforesaid reference point and the cutting block 32 by the motor 40 for a predetermined distance, depending on the particular length of the metal bar stock 28 to be cut, at which point the motor 40 stops to stop the further advance of the metal bar stock and leave it extending outwardly from the cutting block 32 as shown in FIG. 2. At this point, the control panel 26 operates the hydraulic cylinder 36 to move the cutting block laterally with respect to the housing 34 to create a shearing force that severs the metal bar stock 28 at the cutting edge between the housing 34 and the movable cutting block 32, whereupon the movable cutting block 32 is then returned to its initial position by the hydraulic cylinder 36.

As illustrated in FIG. 1, the transfer station 12 includes an extension 68 for supporting a horizontally extending track member 70 which supports a vertically extending carriage 72 for lateral movement therealong by a motor 79, the carriage 72 having mounted thereon vertically extending tracks 73. A vertical member 74 is mounted on the tracks 73 by a mounting plate 75 slidable therealong, and an air cylinder 78 is carried on the vertical member 74 and has a piston 81 that is fixed at its upper end to a plate 77 fixed to the upper end of the carriage 72. The lower end of the vertical member 74 has mounted thereto an air cylinder 81 that is arranged to support thereon a clamp 80 so that the clamp 80 can be moved horizontally back and forth by the air cylinder 81.

In operation, the air cylinders 78 and the motor 79 are operated by the control panel 26 to move the vertical member 74 and the carriage 72 to position the clamp 80 directly in front of the opening 32 through which the metal bar stock 28 to be cut extends so that the end of the metal bar stock 28 is advanced into the clamp 80. After the metal bar stock is cut to length at the cutting station as described above, the air cylinder 81 is operated to move the clamp 80 away from the cutting station 10 to extract the cut metal bar 28 therefrom, and then the drives for the carriage 72 and the vertical member 74 are operated by the control panel 26 to first raise the clamped metal bar 28, and to then move the metal bar horizontally to a position above the hopper 82 where the clamp 80 is operated to release the metal bar stock and drop it into the hopper 82, whereupon the clamp 80 is returned by the carriage 72 and the vertical member 74 to a position for receiving the end of the next metal bar stock 28 to be cut.

Figure 4:
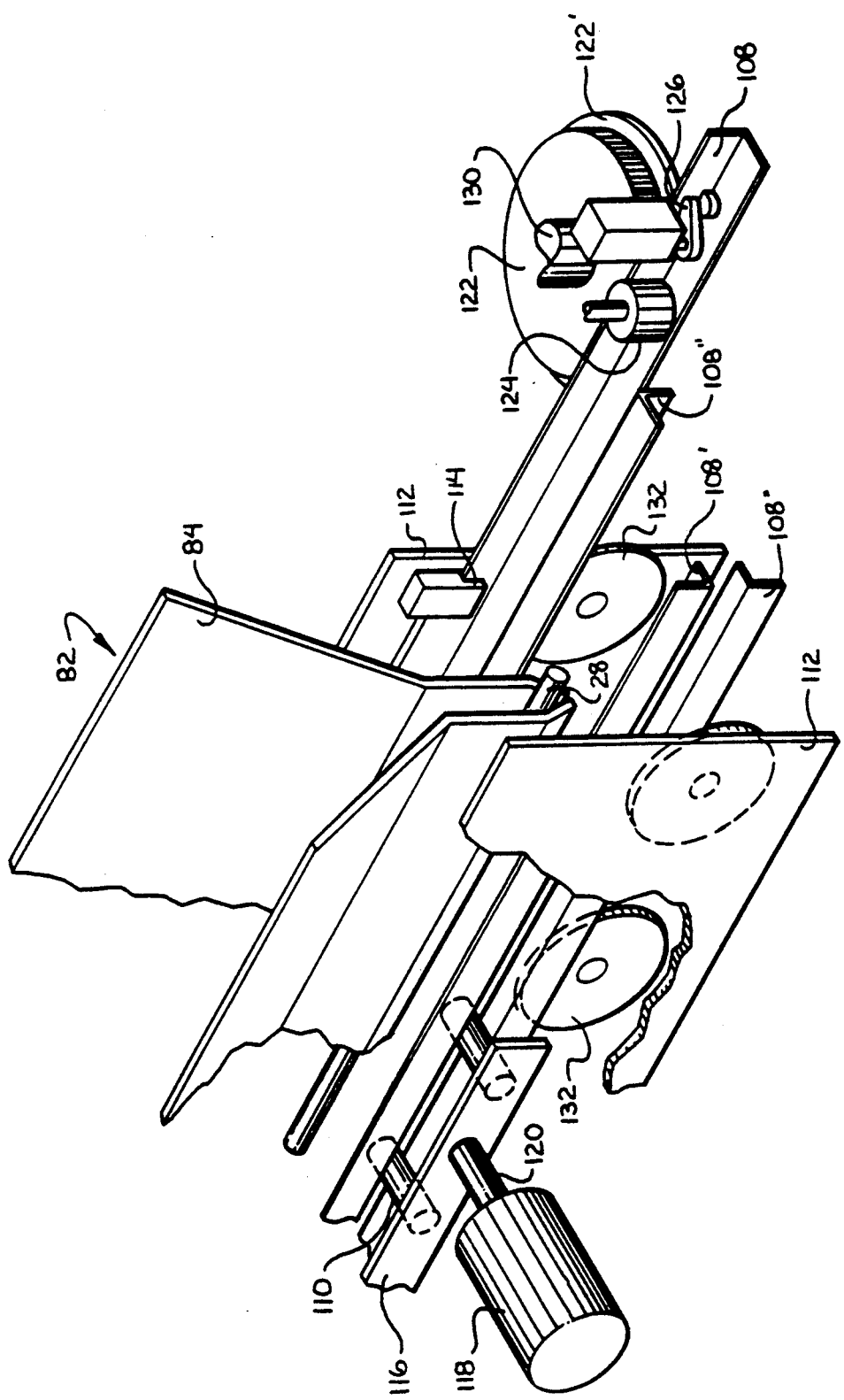
FIG. 4 is a detailed view of the mechanism for advancing the angle irons of the chord members.
Figure 6:
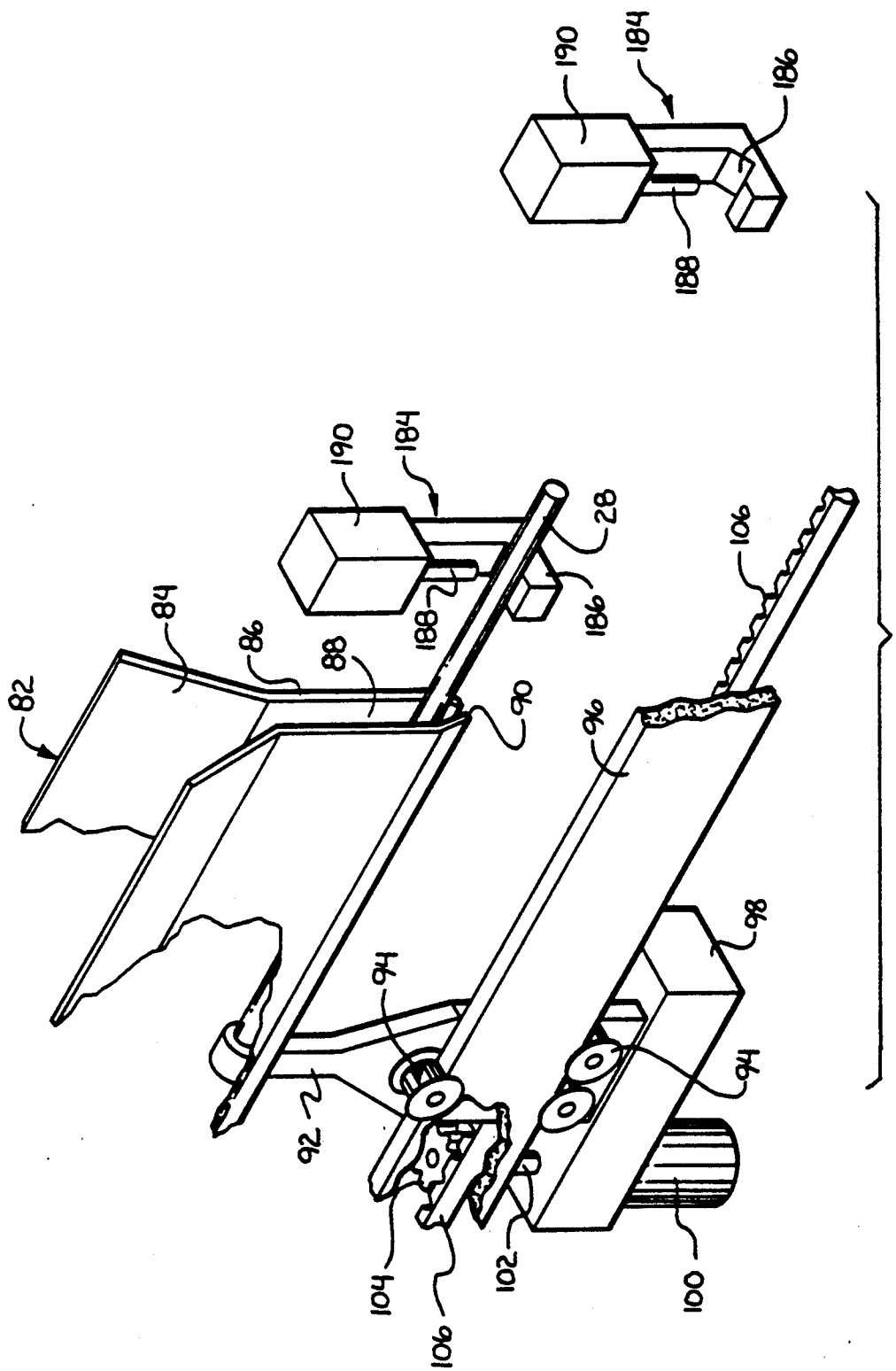
FIG. 6 is a detailed view of the mechanism for advancing the metal bars to the assembly station.

As best seen in the diagrammatic illustrations in FIGS. 4 and 6, the hopper 82 is formed with inwardly diverging side walls 84 that terminate in two corresponding vertical wall portions 86 that are spaced from one another to provide a narrow slot 88 so that when a metal bar 28 is dropped into the hopper 82 it will be guided by the diverging side walls 84 to the slot 88 and be positioned at the bottom thereof as shown in FIG. 6. The vertical walls 86 are bent inwardly at the bottom edge thereof to hold the metal bar 28 and to also leave a horizontally extending opening 90 beneath the metal bar 28, and this opening 90 receives therein the upper end of a vertically disposed advancing finger 92 that is mounted by opposed rollers 94 on a horizontally extending track element 96, and which includes a mounting block 98 carried along the track 96 with the advancing finger 92, the mounting block 98 having a motor 100 carried thereon which is connected through a drive shaft 102 to a drive gear 104 that engages a gear rack 106 as best seen in FIG. 6.

In operation, after a metal bar 28 has been cut to length and dropped in the hopper 82, it is positioned at the bottom of the slot 88, and the upwardly extending advancing finger 92 is positioned to engage the rear end of the metal bar 28 as shown in FIG. 6, the engaging portion of the advancing finger 92 preferably being slightly magnetized to provide a firm, but releasable, engagement between the advancing finger 92 and the metal rod 28. When it is desired to advance the metal bar 28 to the assembly station 16, the motor 100 is operated by the control panel 26 to move the advancing finger 92 horizontally along the track 96 so that the advancing finger 92 pushes the metal rod 28 out of the forward end of the hopper slot 88, and when the advancing finger 92 stops, the aforesaid slight magnetism will cause the metal rod 28 to stop also rather than to continue moving under its own inertia.

As illustrated in FIG. 1, an inventory of angle irons 108 are maintained in a storage area behind the advancing station 14, and, as best seen in FIG. 4, four of these angle irons 108 are positioned at the advancing station 14 in two pairs, each pair having an upper angle iron 108' and a lower angle iron 108" which together will form a chord member of the finished joist. It will also be noted that the angle irons 108' and 108" in each pair are positioned so that the adjacent flanges of the two angle irons are disposed in spaced parallel relationship to one another for ultimately receiving therebetween the ends of a metal bar 28 in a manner to be described presently.

The four angle irons are manually fed into the advancing station 14, and the mechanical arrangement for advancing and supporting the upper angle iron 108' in each pair is identical, as is the mechanical arrangement for advancing and supporting the lower angle iron 108" in each pair. As best seen in FIG. 4, the upper angle iron 108' in each pair is initially supported at its lower horizontal flange by a plurality of spaced and horizontally extending rods 110 and the upper vertical flange is disposed between a vertical plate 112 and an overhanging flange member 114. The rods 110 are fixed to a mounting plate 116 that is moved horizontally by an air cylinder 118 acting through a connecting shaft 120 so that the extending ends of the rods 110 can be selectively moved between a first position at which they are located between the horizontal flanges of the upper angle iron 108' and the lower angle iron 108" for supporting the upper angle iron 108' as shown in FIG. 4, and a second position at which the rod members are withdrawn outwardly from between the angle irons 108', 108" after the upper angle iron 108' has been advanced sufficiently to be supported at the assembly station 16 in a manner to be described presently, this second position of the rods 110 permitting relative vertical movement of the upper angle iron 108' with respect to the lower angle iron 108" for a purpose that will also be described presently. As indicated above, each of the two upper angle irons 108' is advanced manually along the upper surface of the rods 110 until the forward end of the angle iron 108' passes between a knurled drive member 122 and a pressure roller 124 and the forward end of the upper angle iron 108' strikes a limit switch 126 which signals that the upper angle iron 108 is properly positioned to be advanced horizontally by rotating the drive member 122 which is driven by its own motor 128 (see FIG. 5) through a drive shaft 130.

The lower angle iron 108" in each pair is manually fed into the advancing station by positioning the horizontal flange of the angle iron 108" on a plurality of idler rollers 132 mounted in the vertical side wall 112 as illustrated in FIG. 4. The two lower angle irons 108" are advanced manually along these idler rollers 132 until they reach a knurled drive wheel 134 (see FIG. 5) which is identical in construction and function as the drive wheel 122 (with its pressure roller 124 and limit switch 126) as described above, and the second knurled drive member 134 is driven by its own motor 136 (see FIG. 5). Thus, in the same manner as that described above, the lower angle irons 108" are manually advanced along the idler rollers 132 until they strike a limit switch identical to limit switch 126, after which each of the lower angle irons 108" is driven by its own knurled drive member 134 and motor 136.

Therefore, it will be understood that each of the two upper angle irons 108' can be advanced automatically for any desired distance by operating the motor 128 and drive member 122 associated with each of the upper angle irons 108', and, similarly, the lower angle irons 108" can be selectively advanced any desired distance by operating the motors 136 and drive members 134 for a predetermined period of time.

Figure 9:
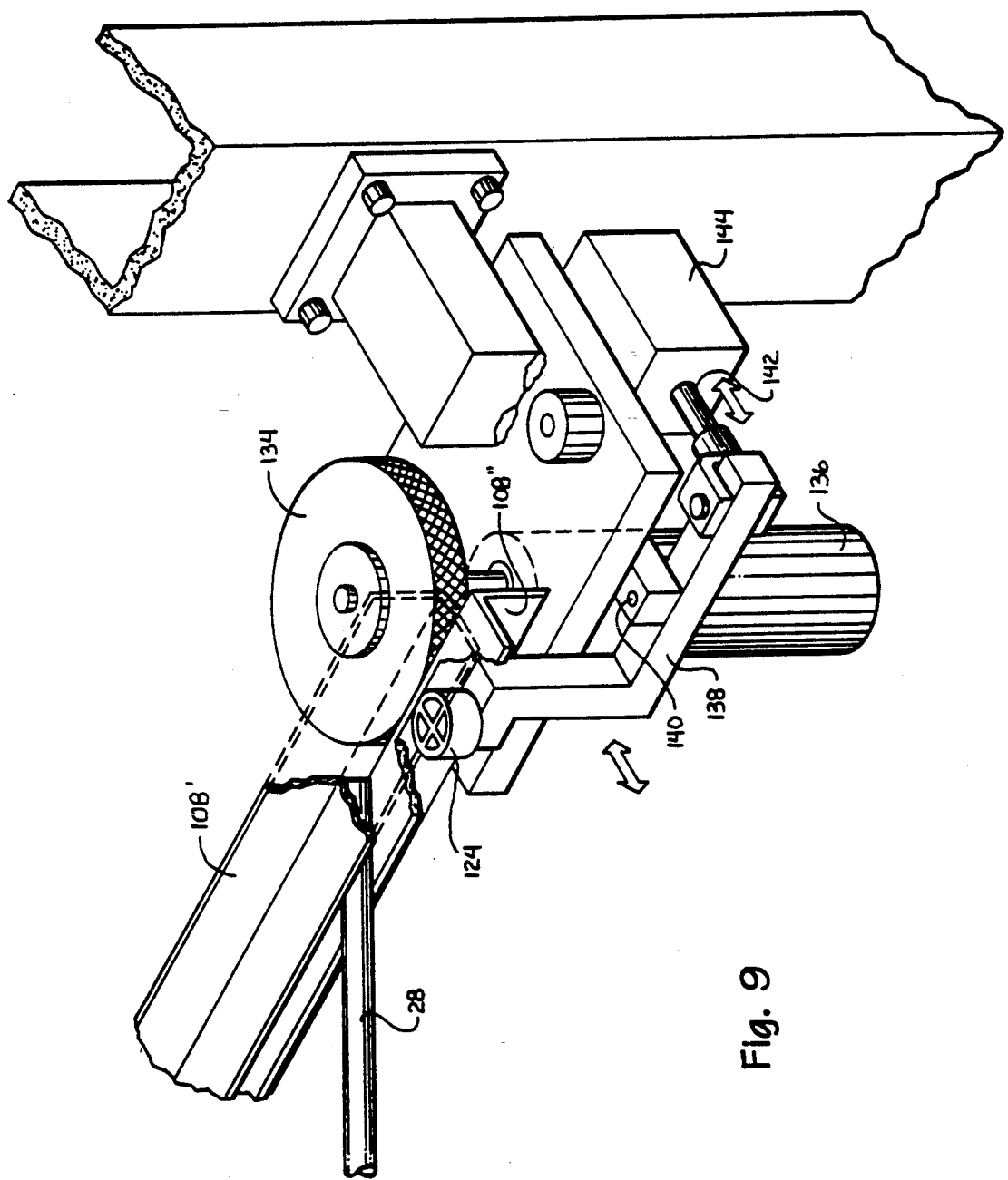
FIG. 9 is a detailed view of the mechanism for advancing the partially formed joist.

FIG. 9 illustrates, in greater detail, the mechanism by which each of the pressure rollers 124 are employed to urge the flanges of the angle irons into contact with their respective drive members. More specifically, FIG. 9 illustrates one of the drive members 134 for one of the lower angle irons 108", and it will be noted that the vertical flange of such angle iron is disposed between the drive member 134 and the pressure roller 124, and the pressure roller 124 is carried on a pivot arm 138 pivoted about a pivot shaft 140 and having its other end attached to the reciprocating piston rod 142 of an air cylinder 144. When the end of an angle iron engages its associated limit switch 126 (see FIG. 4), the limit switch generates a signal which operates the air cylinder 144 to extend the piston rod 142 and thereby cause pivot arm 138 to firmly press the flange of the angle iron against the knurled surface of the drive member 134. Moreover, when the angle iron has been advanced during the joist making operation to such an extent that the trailing end of the angle iron clears its associated limit switch 126, the air cylinder 144 is operated in a reverse direction to move the pivot arm 138 and its attached pressure roller 124 away from the drive member 134 so that a new angle iron can be received therebetween.

In FIG. 1, some of the details of the construction of the assembly station 16 which are shown in other figures have been deleted in FIG. 1 so as to more clearly illustrate the relative position of the two horizontally extending angle iron supports 146 and 148 which are utilized to support the horizontal flanges of the two bottom angle irons 108". The left hand (as viewed in FIG. 1) horizontal support member 146 is mounted in fixed relation to the frame 150 of the assembly station 16, and the other horizontal support 148 is mounted on a vertical wall 152 carried on a platform 154 that is movable along guide rails 156 (one of which is visible in FIG. 1), and a drive motor 158 operates a drive gear 160 that engages a rack 162 disposed at the underside of the platform 154 whereby operation of the motor 158 will cause the entire platform, including the horizontal support 148, to move away from and toward the fixed horizontal support 146. Since the apparatus of the present invention is designed to make joists of a variety of different sizes, the selectively movable platform 154 permits the two horizontal supports 146 and 148 to be adjustably spaced from one another so that they can support the two pairs of angle irons at any desired spacing that is required for the design of a particular joist that is being made.

Figure 5:
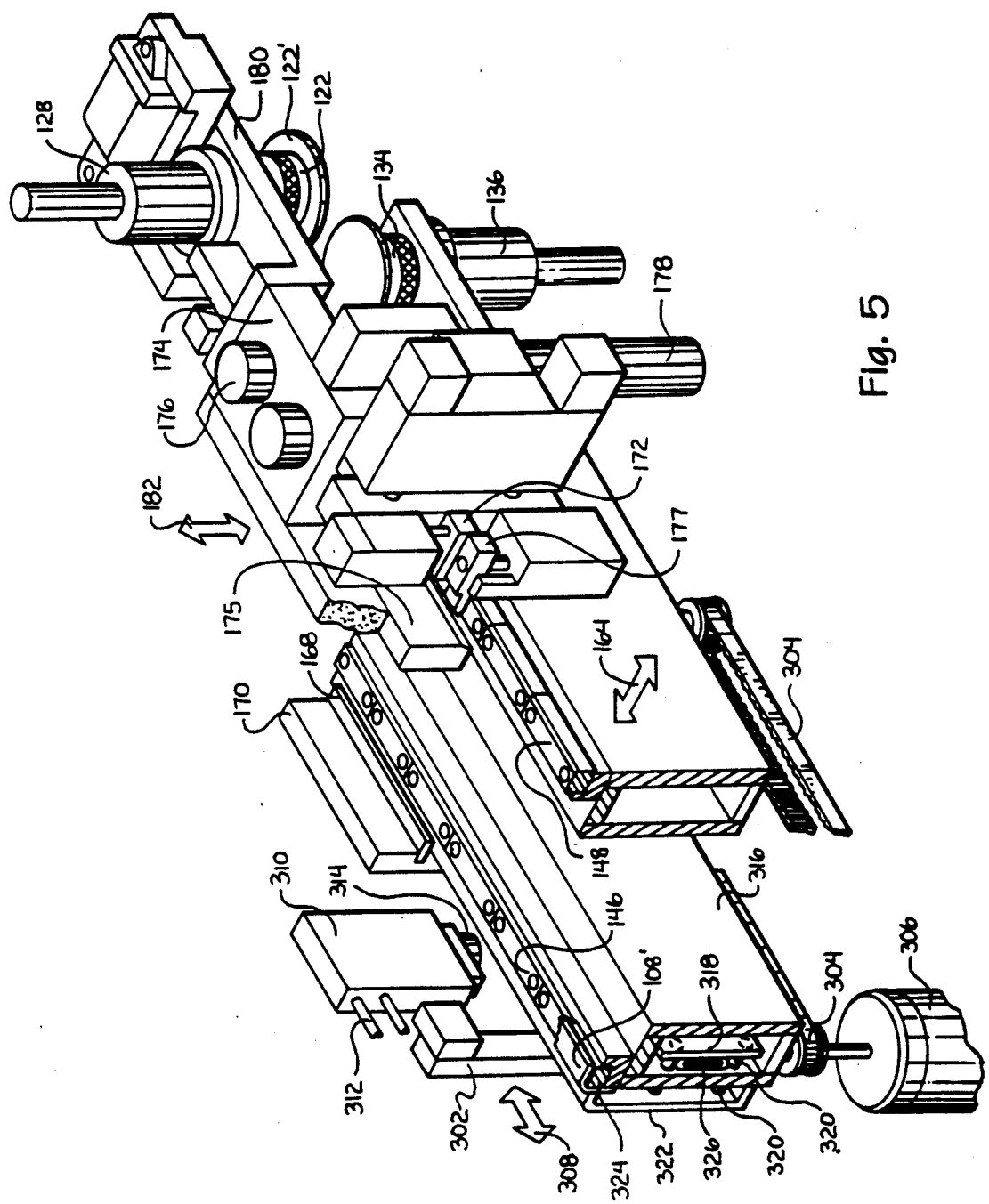
FIG. 5 is a detailed view of the arrangement for advancing and positioning the angle irons at the assembly station.

The horizontal supports 146 and 148 are shown in greater detail in FIG. 5, and the direction arrow 164 indicates the above-described movement of the movable horizontal support 148 toward and away from the fixed horizontal support 146. The horizontal supports 146, 148 each include a horizontal surface across which the horizontal flanges of the two lower angle irons 108" slide when they are advanced by their respective drive members 134 as described above. An outwardly extending flange 168 is positioned above each of the horizontal support surfaces 146 and 148 to slidably support the horizontal flanges of the upper angle irons 108', one of these flanges being visible in FIG. 5 and it being understood that an identical flange is positioned above the horizontal surface of the movable horizontal support 148. The vertical walls 170 from which the horizontal support flanges 168 extend are both fixed to the beam 316.

A block 174 is vertically mountable on two vertically extending guide shafts 176 by a motor 178 through a conventional cam and follower arrangement (not shown), and it will also be noted that the movable block 174 is fixed to an L-shaped support member 180 on which is mounted the upper angle iron drive member 122 and its motor 128. Accordingly, when the block 174 is moved vertically upwardly or downwardly by the motor 178, the entire assembly for advancing the upper angle iron 108' moves together as an integral unit, and the upper angle iron 108' is therefore moved relative to the adjacent lower angle iron 108" by the flange portion 122' of the drive member 122 to increase and decrease the spacing therebetween for a purpose to be described presently. Additionally, a clamping finger 172 is arranged to be moved vertically (see direction arrow 182) by an air cylinder (not shown) for urging the upper angle iron 108' upwardly against the block 175 away from the lower angle iron 108" so that the ends of a metal bar 28 may be easily disposed therebetween as will be described presently, and a second clamping finger 177 is arranged to be moved vertically by an air cylinder (not shown) for urging the lower angle iron 108" downwardly into firm contact with the supports 146, 148 to assist in separating the upper and lower angle irons 108', 108".

Figure 7:
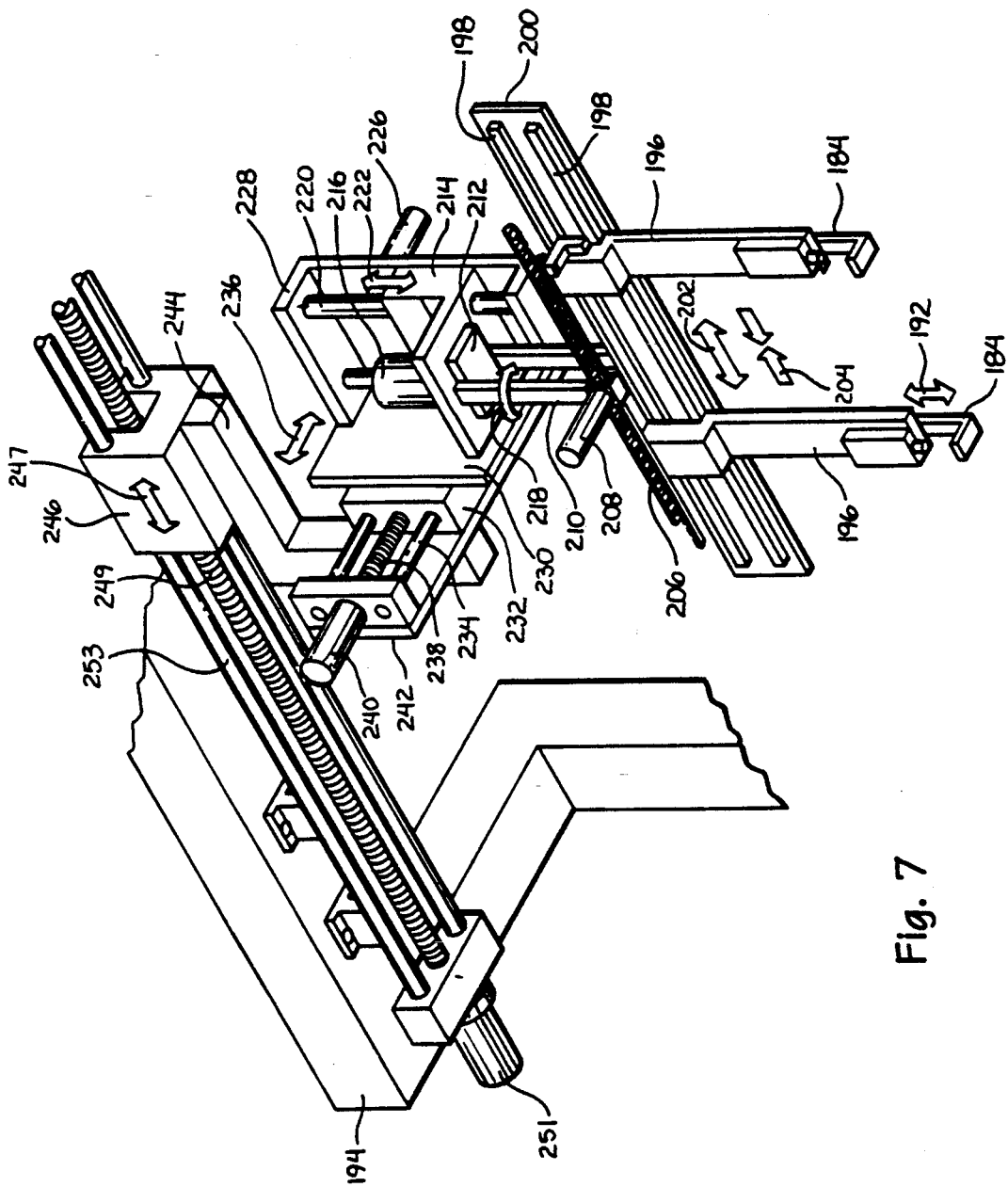
FIG. 7 is a detailed view of the mechanism for grasping, manipulating, and positioning the metal bars at the assembly station.

As illustrated in FIGS. 4 and 6, the above described hopper 82 is disposed between the two pairs of upper and lower angle irons 108', 108", and when the metal bar 28 in the slot 88 is advanced forwardly by the moveable finger 92 as described above, the metal bar is moved into a position at which it is cradled by two identical grasping heads 184 which are shown diagrammatically in FIG. 6, and which are part of the manipulating and grasping equipment 20 that is shown in more detail in FIGS. 1 and 7, each of the grasping heads 184 being formed with a V-shaped cradle portion 186 in which the metal bar 28 rests and a selectively moveable clamping pin 188 that is moved vertically by an air cylinder 190 between a raised position which permits the metal bar 28 to be slidably received in the cradle portions 186 and a lowered position in which it presses against the upper surface of the metal bar 28 and holds it securely in place in the cradle portions 186, the vertical movement of the pins 88 being indicated by the direction arrow 192 in FIG. 7.

As best seen in FIGS. 1 and 7, the aforesaid frame 150 includes a superstructure 194 on which the manipulating and grasping equipment is carried, and the two grasping heads 184 are each mounted on a vertical plate 196 that is slidably carried on the tracks 198 of a horizontal plate 200. The vertical plates 196 are moveable toward and away from one another along the tracks 198 as indicated by the direction arrows 202 and 204 by a rack and pinion drive 206 that is operated by a motor 208, this selective movement of the grasping heads 184 toward and away from one another being provided to vary the spacing therebetween so that the grasping heads can be properly positioned to support metal bars 28 of varying lengths. The horizontal plate 200 is supported by a bracket 210 fixed at its upper end to a support plate 212 positioned beneath an L-shaped carriage 214, the plate 212 being rotatable about a vertical axis by a motor 216 whereby operation of the motor 216 causes rotation of the horizontal plate 200 and the grasping heads 184 carried thereby, as indicated by the direction arrow 218. The L-shaped carriage 214 is moveable along guide rails 220 in a vertical direction indicated by the direction arrow 222, this vertical movement being caused by a conventional cam and follower arrangement (not shown) which is operated by a motor 226 mounted on a U-shaped support 228. The U shaped support 228 is itself supported on a vertical plate 230 that is carried by a moveable block 232 for horizontal movement along guide members 234 as indicated by the direction arrow 236, this movement being caused by a rotatable screw element 238 threadably engaging the block 232 and being operating by motor 240 which are mounted on another vertical plate 242 that is fixed to an inverted L-shaped support member 244 carried by another moveable block 246. The moveable block 246 is also moveable in a horizontal direction perpendicular to the horizontal direction of movement of the first moveable block 232, such movement being indicated by the direction arrow 247 and being caused by a screw element 249 threadably engaging the block 246 and rotated by a motor 251 to cause movement along the guide elements 253, this entire arrangement being fixed to the previously described superstructure 194.

Thus, it will be understood that the grasping heads 184 are moveable toward and away from one another so as to be able to engage and support metal bars of various lengths, and the metal bar 28 can then be manipulated and positioned relative to the angle irons in a manner to be described presently, and it will be appreciated that the metal bars 28 can be moved and manipulated in virtually any direction in view of the compound movements of the turret arrangement illustrated in FIG. 7, namely the rotational movement indicated by direction arrow 218, the vertical movement indicated by direction arrow 222, and the X-Y horizontal movement indicated by the direction arrows 236 and 248.

Figure 8:
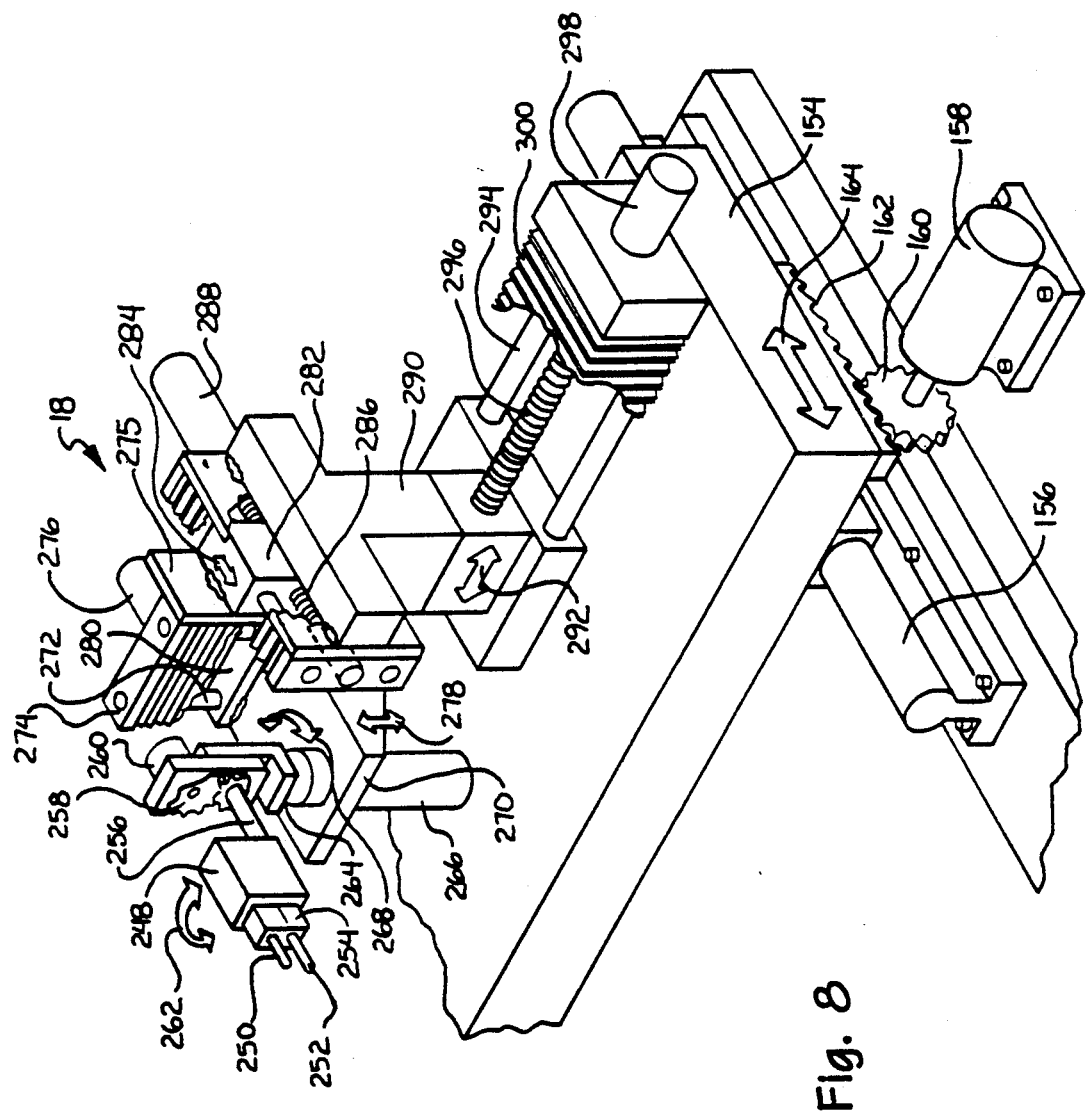
FIG. 8 is a detailed view of one of the welding heads and the mounting arrangement therefor.

The previously described moveable platform 154, which carries the moveable horizontal support 148 thereon, also carries thereon welding equipment 18 at one side of the assembly station 16, and it will be understood that the welding equipment on the other side of the assembly station 16 (see FIG. 1) is identical to that illustrated in FIG. 8 except that it is mounted on a fixed beam 150' forming part of the frame 150 rather than on a moveable platform. The welding equipment 18 includes a welding head 248 on which are mounted a copper welding tip 250, through which passes a flux cored wire, and a position sensor 252 that is moveable into and out of an operator 254, the sensor preferably being of a type like Model LRT-7500 manufactured by Teknar EMC in Fenton, Mo. and the sensor including a controller that is preferably like Model Cylcon Series 5000 manufactured by the same company. As will be explained in greater detail below, the sensor 252 is operated to move outwardly from the operator 254 until it makes contact with anything in its path, whereupon it stops and generates a signal that is a function of the location of the item contacted by the sensor 252. The welding head 248 is rotatably mounted on a shaft 256 that is rotated through a gear drive 258 by an air cylinder 260, this rotational movement of the welding head 248 being indicated by the direction arrow 262 in FIG. 8. This entire arrangement is carried on an L-shaped support 264 which is rotatable about a vertical axis by a motor 266 as indicated by the direction arrow 268. The motor 266 and the L-shaped support 264 are mounted on a support plate 270 that is moveable in a vertical direction along guide members 272 by a conventional cam and follower arrangement (not shown) driven by a motor 276, this vertical direction of movement being indicated by the direction arrow 278. The guide members 272 are supported by the support 274, which is fixed to a plate 275 mounted on a block 282 that is moveable in a horizontal direction (see direction arrow 284) by a screw 286 rotated by a motor 288, all of which is in turn mounted on a vertical extension 290 that is moved horizontally (see direction arrow 292) along guides 294 by a screw 296 rotated by a motor 298. Since all of the various drive screw members associated with the welding equipment 18 are located at ground level and therefore can present safety hazards when they are rotating, all of these screw members are preferably covered by an accordion-shaped flexible cover 300.

As was the case with the grasping heads 184 described above, the welding heads 248 can be moved relative to the platform 154 through a wide range of positions by virtue of the compound movements indicated by the direction arrows 262, 268, 278, 284, and 292.

A mechanism is also provided on both sides of the assembly station 16 for firmly pressing together the angle irons 108', 108" and the metal bars 28 positioned therebetween for welding so that an improved weld is formed at the points of abutment. One of these mechanisms is illustrated in FIG. 5 adjacent the fixed horizontal support 146, but it will be understood that an identical mechanism is also positioned on the platform 154 adjacent the other moveable horizontal support 148. This mechanism includes a vertically extending transport member 302 that is fixed to a horizontally extending drive belt 304 driven by a motor 306 so that operation of the motor 306 will result in the vertical transport member 302 moving in a horizontal direction along and closely adjacent the fixed horizontal support 146 as indicated by the direction arrow 308. Mounted on the transport member 302 is an air cylinder 310 having air inlet and outlets 312, and having a pressing piston 314 which is moved vertically in an upward and downward direction by the air cylinder 310. The pressing piston 314 is positioned directly above the fixed horizontal support 146 so that when, at the assembly station 16, a metal bar 28 is positioned between the two pairs of angle irons 108' and 108" in preparation for welding, the air cylinder 310 is operated to lower the pressing piston 314 into contact with the upper angle iron to firmly press the angle irons and the metal bar sandwiched therebetween firmly together in preparation for welding.

FIG. 5 also illustrates an arrangement for forming a camber in one chord member of the finished joist made by the apparatus of the present invention, namely the chord member that will be the top chord member when the joist is placed across a span in a load bearing application. The beam 316 which supports the fixed horizontal support 146 is hollow, and mounted within the beam 316 is a plate 318 that extends longitudinally along the axis of the beam 316, and the plate 318 has fixed thereto at predetermined spacings along its length pairs of connecting rods 320 that extend through the wall of the beam 316 to a connection with a U-shaped pressure plate 322 that extends longitudinally along the outside of the beam 316. The upper horizontally extending leg of the U-shaped pressure plate 322 is normally spaced from a pressing bar 324 that forms the upper horizontal support 146 so that the vertically extending flange of the bottom angle iron 108' (a small portion of which is illustrated in FIG. 5) is freely moveable in such spacing during advancement of the joist. An inflatable hose member 326 extends longitudinally within the beam 316 between the wall thereof and the plate 318, the hose member 326 being shown in FIG. 5 in its normal collapsed condition. However, at some point between each indexing movement of the angle irons during the joist making process, the hose member 326 is fully inflated with fluid from any convenient source (not shown), and the inflation of the hose member 326 urges the plate 318 away from the side wall of the beam 316 so that the connecting rods 320 will press the U-shaped pressure plate 322 toward the beam 316 and the upper horizontal leg of the U-shaped pressure plate will firmly press the vertical flange of the angle iron 108' against the pressure bar 324. The outside vertical surface of the pressure bar 324 is formed with a gradual convex or bowed shape from one of its ends to the other, and when the flange of the angle iron 108' is pressed thereagainst by the U-shaped pressure plate 322 it imposes enough force to bend the flange into the shape of the reference surface of the pressure bar 324, and the accumulation of these bends along the entire length of the lower chord member of the finished joist will form the desired camber in that chord member to such an extent that the camber requirements of the Steel Joist Institute are met.

Figure 23:
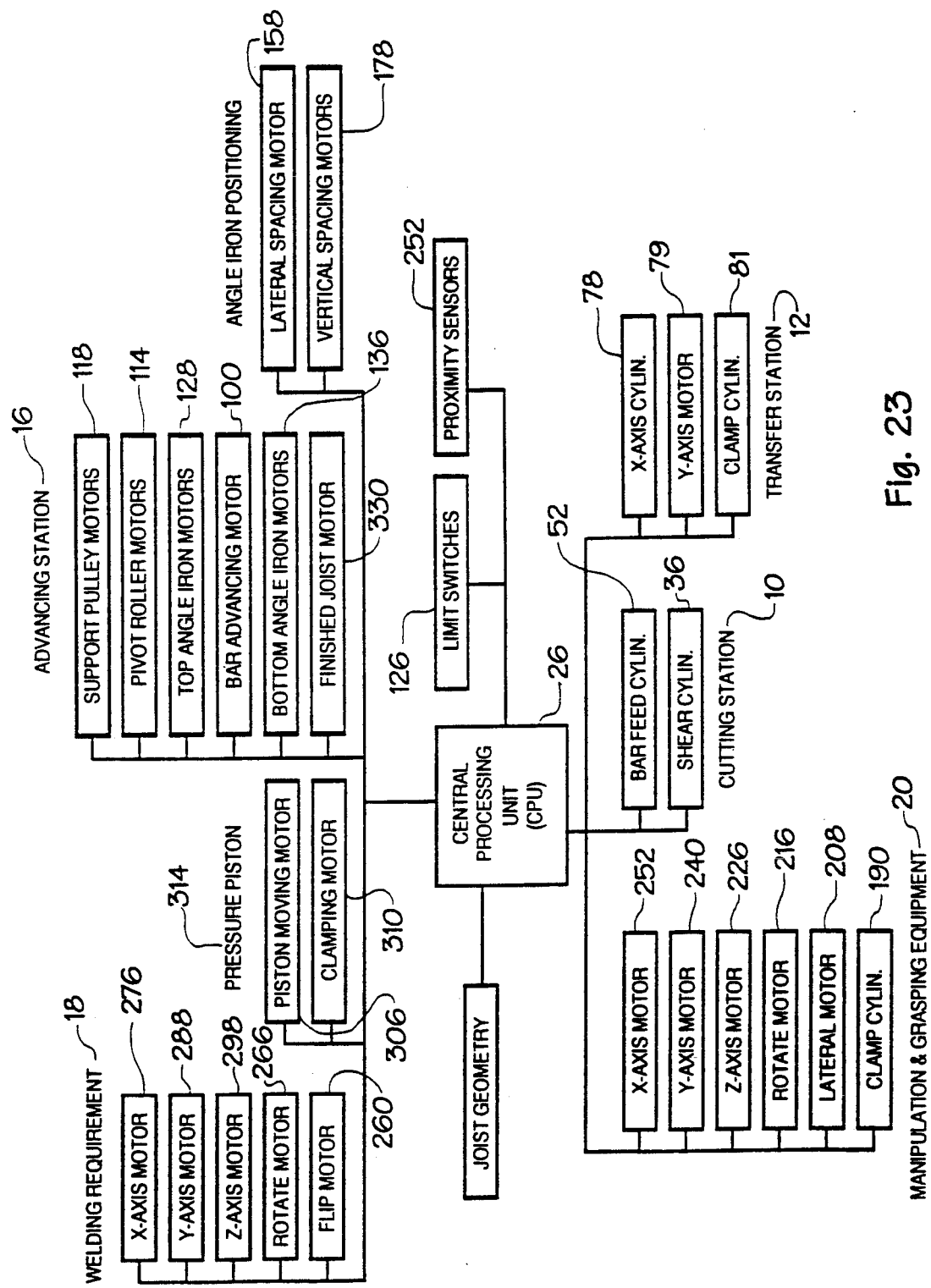
FIG. 23 is a block diagram of the control system of the present invention.

Except for the hydraulic cylinder 36 which operates the cutting block 32, all of the various cylinders described above are preferably conventional pneumatic cylinders having a pressurized air input that can be controlled through electronic signals generated by the control panel 26 to carry out the various cylinder-operated functions described in detail above. FIG. 23 is a diagrammatic illustration of the control system for the apparatus of the present invention showing all of the aforesaid cylinders and other control components which receive signals from and/or transmit signals to the CPU in the control panel 26.

To operate the apparatus of the present invention which is described above, the design criteria for the particular joist to be made by the apparatus is fed into the CPU at the control panel 26 which is programmed to determine, in proper sequence, the length and diameter size for each linear metal bar 28 that is to be used in forming the web for that particular joist, and the CPU generates an output signal that is transmitted to the controls for the motor 40, and air cylinders 36 and 52 which, as described above, advance, in the proper sequence, the metal bar stocks 28, each of which is of the correct diameter and is advanced and cut by the cutting block 32 to form each metal bar with the correct design length. As each metal bar is cut at the cutting station 10, it is grasped by the clamp 80 at the transfer station 12 which extracts the metal bar 28 and which is then moved vertically and horizontally as described above until the cut metal bar 28 is located above the hopper 82, whereupon it is dropped into the hopper 82 and is guided into the slot 88 thereof.

Four appropriate angle irons are manually fed along the guide rods 110 and the idler rolls 132 as described above until each angle iron reaches its associated limit switch 126 which generates a signal that is transmitted to the CPU which generates an output signal that operates the air cylinder 144 to move the pressure roller 124 against its associated angle iron and press it against its associated drive member 122 or 134, and the motors 128 and 136 are operated by the CPU to advance the angle irons for a predetermined distance into the assembly station 16, whereupon the movement of the angle irons 108' and 108", is stopped. Again, depending on the design criteria for the particular joist being made, the control panel 26 transmits a control signal to the motor 158 which moves the platform 154 toward or away from the stationary angle iron support 146 until the correct lateral chord spacing for the joist is obtained. Next, the motor 100 is operated to advance the finger 92 along the slot 88 to push the metal bar 28 therein into the cradle portions 186 of the grasping heads 184 which have been positioned by the motor 28 at the exact predetermined spacing required for the particular length of that metal bar 28, and the clamping pins 188 are then operated to securely hold the metal bar 28 in place in the grasping heads 184. The aforesaid proper spacing between the grasping heads 184 is such that the midpoint of the metal bar is equally spaced from the two grasping heads 184 and lies on the axis of rotation of the vertical supports 210. The motor 226 is then operated by the CPU to raise the grasping heads 184 and the metal bar therebetween to an appropriate height, and the motors 240 and 252 of the turret equipment are then operated to move the grasping heads 184 and the metal bar 28 to a position above and intermediate the two pairs of angle irons 108' and 108" at the assembly station 16, with the metal bar 28 extending generally parallel to the angle irons 108' and 108". The motor 226 is then again operated by the CPU to lower the grasping heads 184 and the metal bar 28 to a position between the two pairs of angle irons and at a level corresponding to the spacing between the angle irons 108' and 108" in each pair. At this point, the motor 178 is operated to raise the block 174 on each side of the assembly station 16 by a small increment of movement, and since the block 174 is integrally connected to the entire support and drive arrangement for the upper angle irons 108' in each pair, this movement results in a slight increase in the spacing between the spaced horizontal flanges of the upper and lower angle irons 108' and 108", the exact distance being determined by the CPU depending on the diameter of the metal bar 28 so as to provide a predetermined clearance when the ends of the metal bar 28 are moved between the spaced angle irons. After this increased spacing has been established, the motor 216 is operated for a precise period of time by the CPU so that the grasping heads 184 and the metal bar 28 are rotated about the axis of rotation of the vertical supports 210, and, as noted above, since the midpoint of the metal bar is midway between the grasping heads 184, this midpoint falls on the aforesaid axis of rotation so that the motor 216 can be operated to position the metal bar with its end portions between the two pairs of spaced angle irons and with the metal bar 28 extending between such pairs of angle irons at the precise angle required at that particular part of that particular joist as determined by the particular design criteria for that joist. Just prior to the ends of the metal bar 28 being positioned between the two pairs of angle irons, the clamping fingers 172, 177 are operated as described above to insure that there is adequate spacing between the angle irons in each pair to readily receive the ends of the metal bar 28. After the ends of the metal bar 28 have been positioned in this manner between the two pairs of angle irons, the motor 178 is again operated to lower the block 174, and the clamping fingers 172, 177 are operated to release the angle irons, all of which causes the upper angle iron 108' in each pair to be lowered until it abuts the top surface of the adjacent end of the metal bar 28, after which the motor 306 is operated to move the vertical transport 302 until the pressure piston 314 is properly positioned above the upper angle iron 108', whereupon the air cylinder 310 is operated to move the pressure piston 314 downwardly to press the angle irons 108' and 108" together so that there is firm abutment between these angle irons and the ends of the metal bar 28 sandwiched therebetween so that they are ready for the welding operation.

One of the unique features of the present invention which makes feasible the fully automatic welding of the several components of a joist is the sequence by which the metal bars 28 are positioned between the two pairs of angle irons 108', 108" and the points at which the welds are applied, this sequence being diagrammatically illustrated in FIGS. 10–16, which show the welding sequence in a perspective diagrammatic view, and corresponding FIGS. 17–22 which show the same sequence of welding operations, but in a diagrammatic side view. To better understand the welding sequence, the joist illustrated in FIGS. 10–16 has been indexed through indexing steps so that several different metal bars are shown, these metal bars being designated as "BAR 0" for the first metal bar positioned between the angle irons in this particular sequence, "BAR 1" for the second metal bar positioned between the angle irons in the same sequence, and "BAR 2" for the third bar in the sequence.

Figure 10:
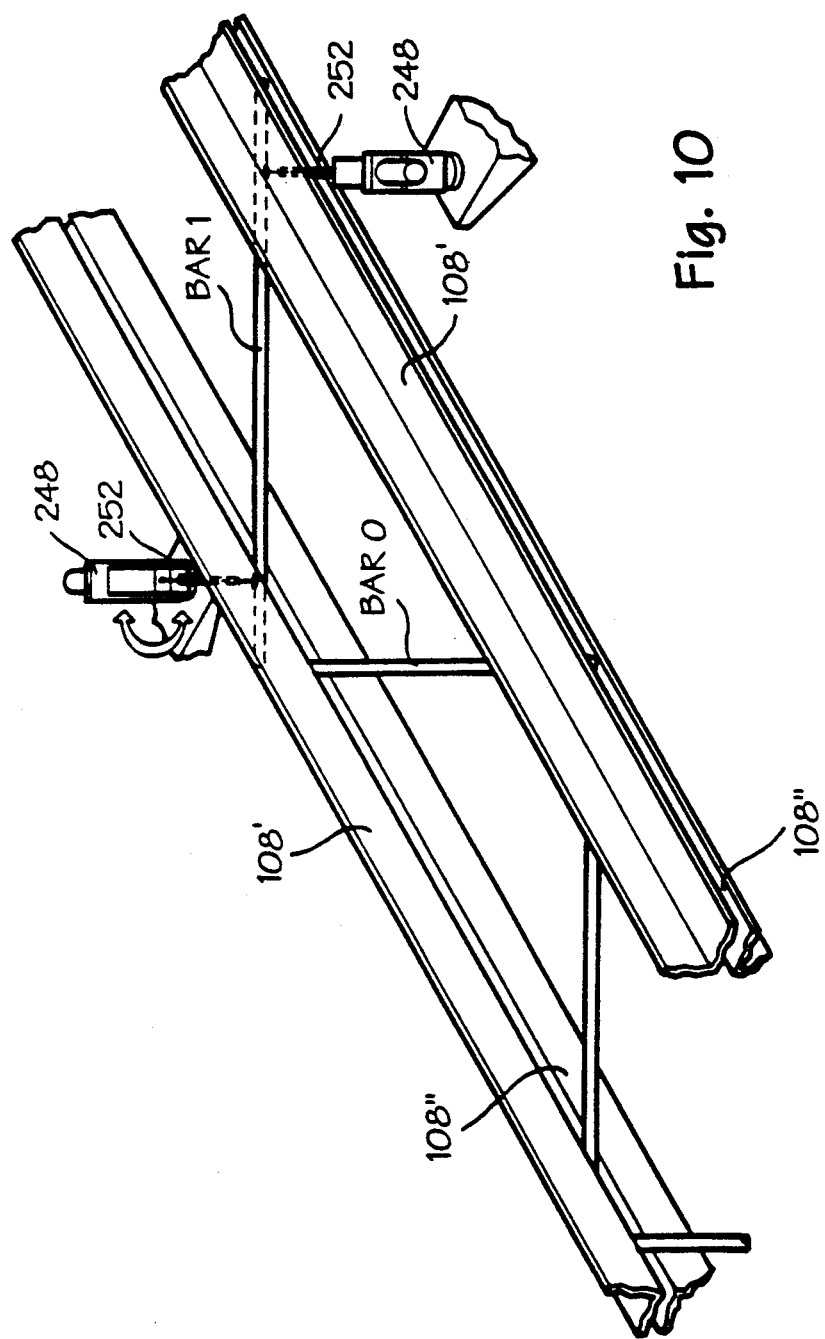
FIGS. 10-16 are schematic drawings illustrating in perspective views the sequence of steps by which the metal bars are welded to the chord members.
Figure 11:
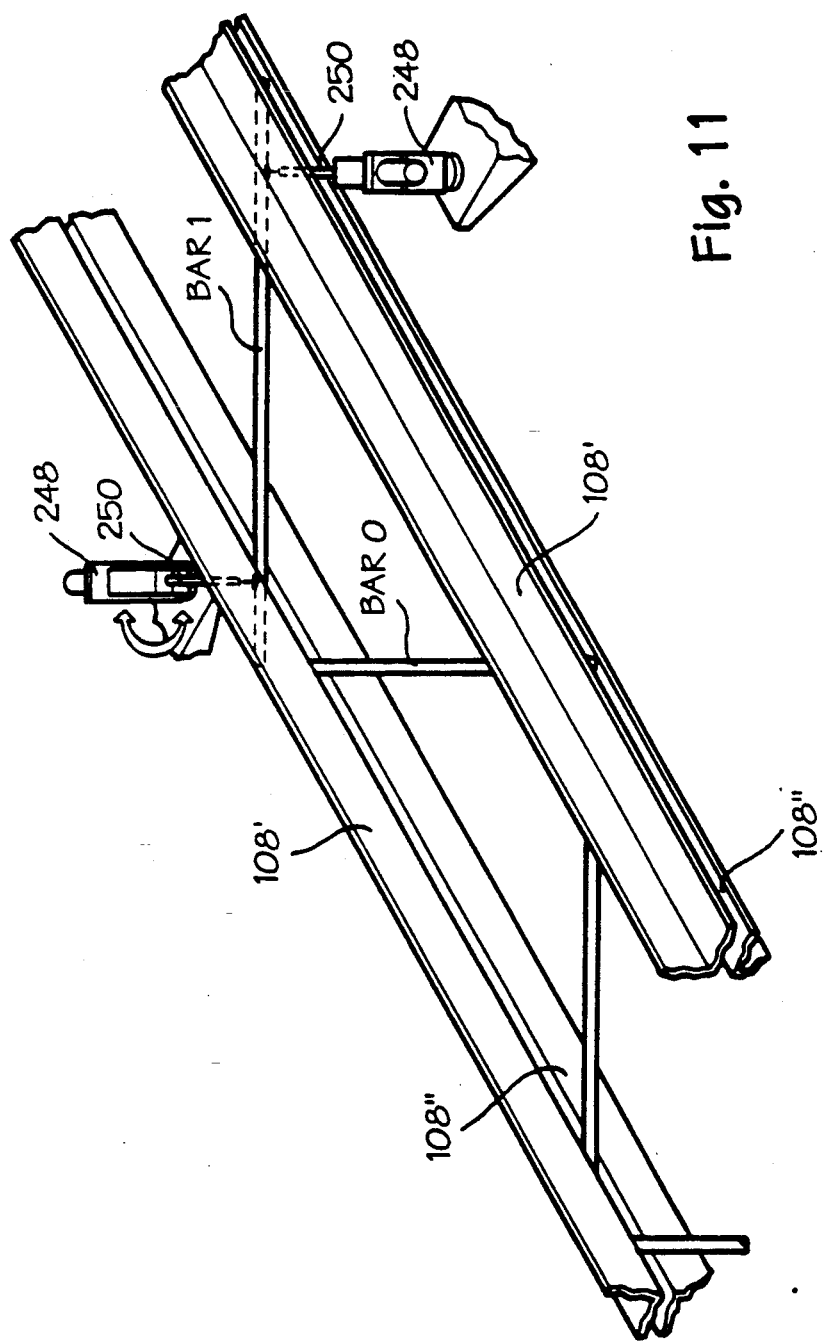
Figure 12:
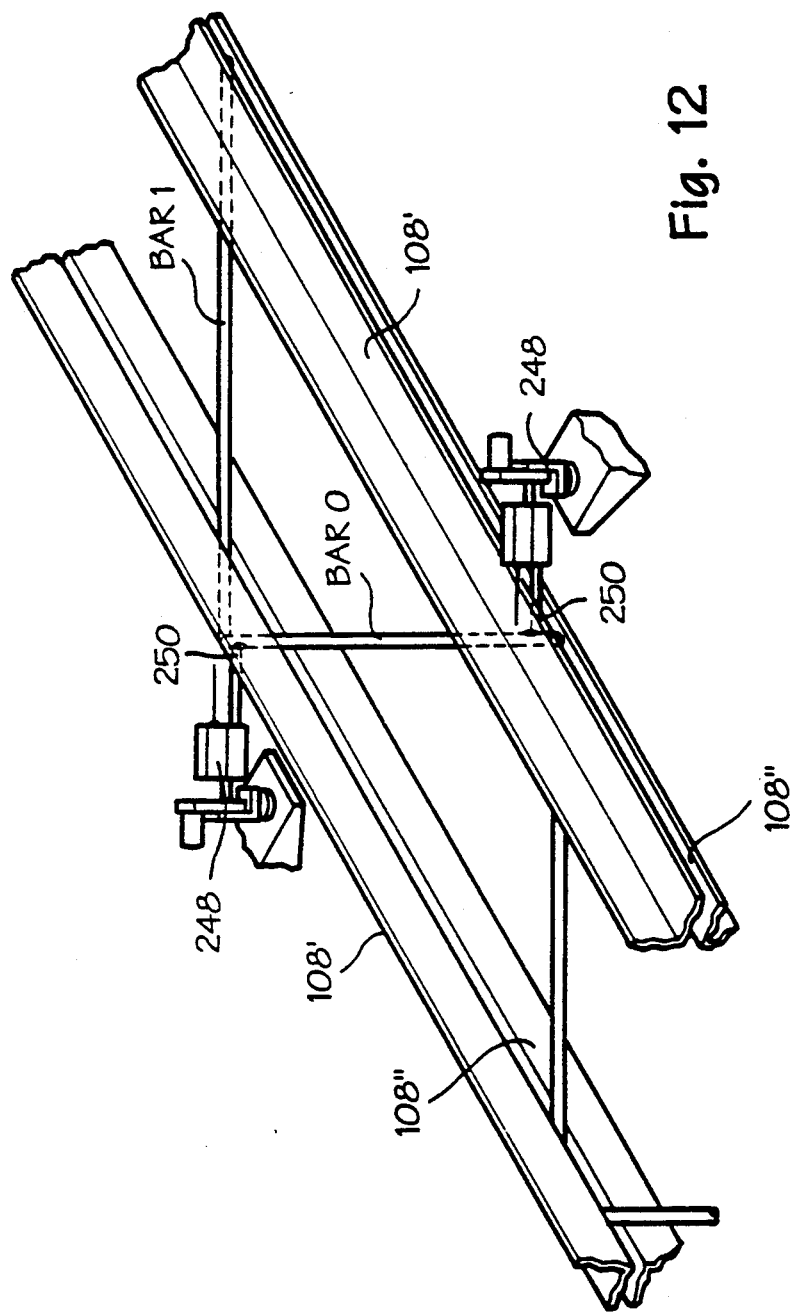
Figure 17:
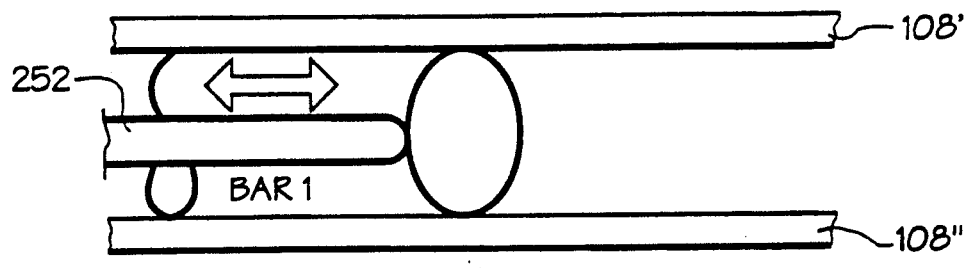
FIGS. 17-22 are diagrammatic detailed views illustrating in side elevational views, the same general sequence of welding steps illustrated in FIGS. 10-16.
Figure 18:
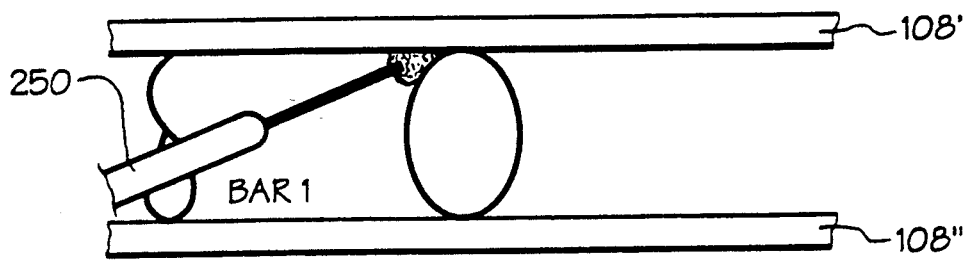
Figure 19:
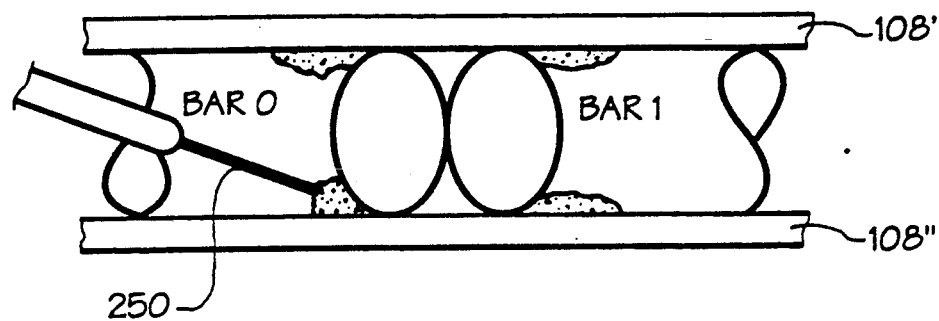

The first step in the sequence is illustrated in FIG. 10 and corresponding FIG. 17, which show that the welding head 248 has been properly positioned in the general vicinity of the ends of BAR 1 which has just been positioned between the two pairs of angle irons 108', 108" as described above, this positioning of the welding head 248 being accomplished by the coordinated operation of the motors 266, 276, 288 and 298 (see FIG. 8) under the control of the CPU. The position sensor 252 is extended outwardly from its controller 254 until it contacts the end of BAR 1 as shown in FIG. 17, and a signal is generated which is a function of the exact position of the end of the metal bar, after which the sensor 252 is retracted and the welding head 248 is rotated about its horizontal axis as indicated by the direction arrow 262 in FIG. 8 until the welding tip 250 is positioned so that it can be advanced toward the end of BAR 1 and the sensor 252 is below the welding tip 250 so that it does not interfere with this movement. Since the sensed position of BAR 1 has been transmitted to the CPU, the CPU then operates the appropriate motors associated with the welding head 248 so that it is advanced by a distance that puts the flux cored wire passing through welding tip 250 in contact with the point of abutment between the top surface of BAR 1 and the upper angle iron 108' as shown in FIGS. 11 and 18. An electric current is then passed through the welding tip 250 in accordance with conventional welding technology, and the weld is made. The welding head 248 is then withdrawn from its welding position, and it is relocated adjacent the end of BAR 0 (the upper surface of which has already been welded to the upper angle iron 108' in a previous welding sequence), and the welding head 248 is again advanced until the welding tip 250 contacts the point of abutment between the lower surface of BAR 0 and the bottom angle iron 108" as shown in FIGS. 12 and 19. It should be noted at this point that the position sensor 252 could be used prior to the welding at the bottom surface of BAR 0, but since the position of the end of BAR 0 has already been sensed by the position sensor 252 in the preceding welding sequence, it is generally not necessary to use the position sensor 252 a second time.

Figure 13:
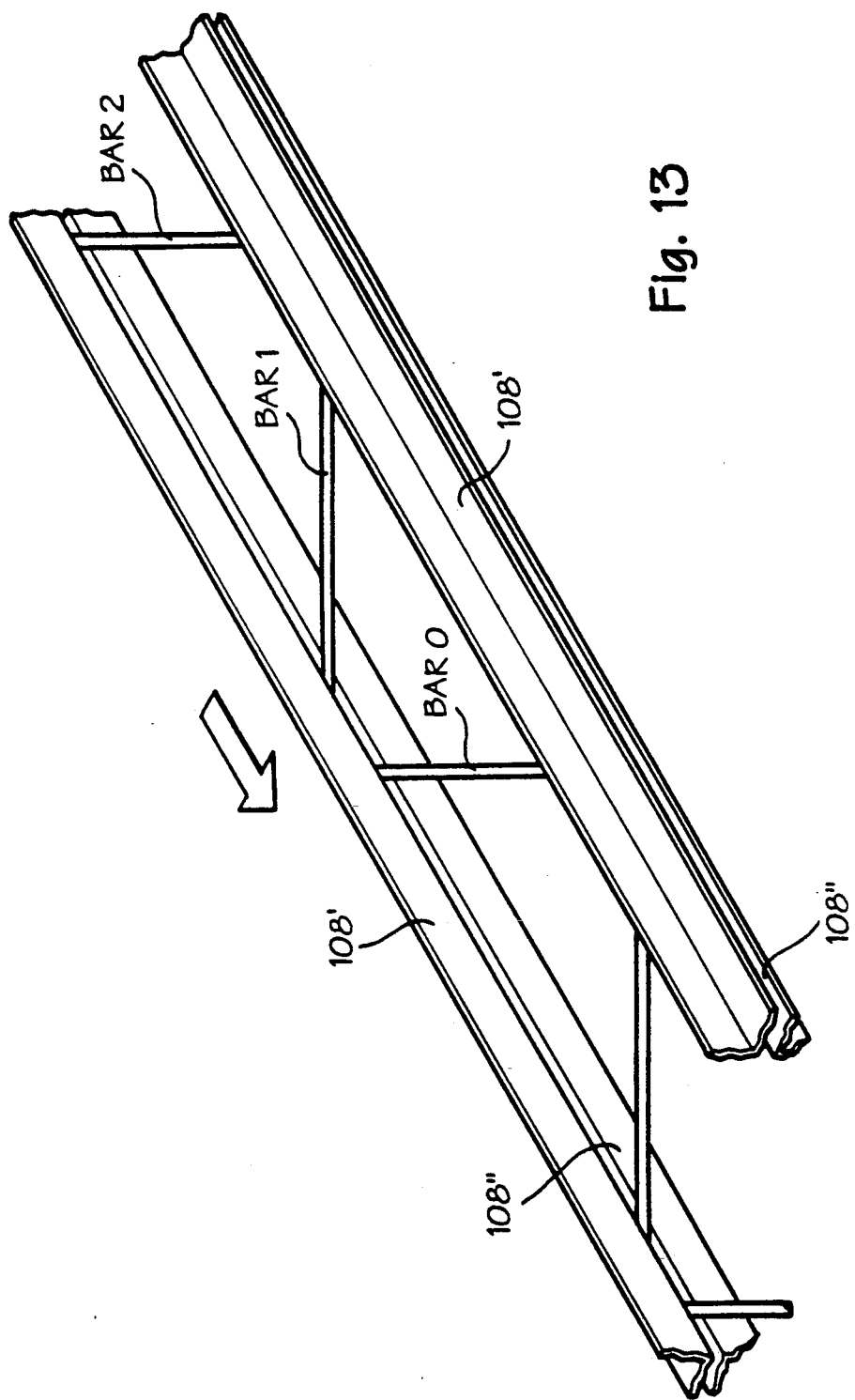
Figure 14:
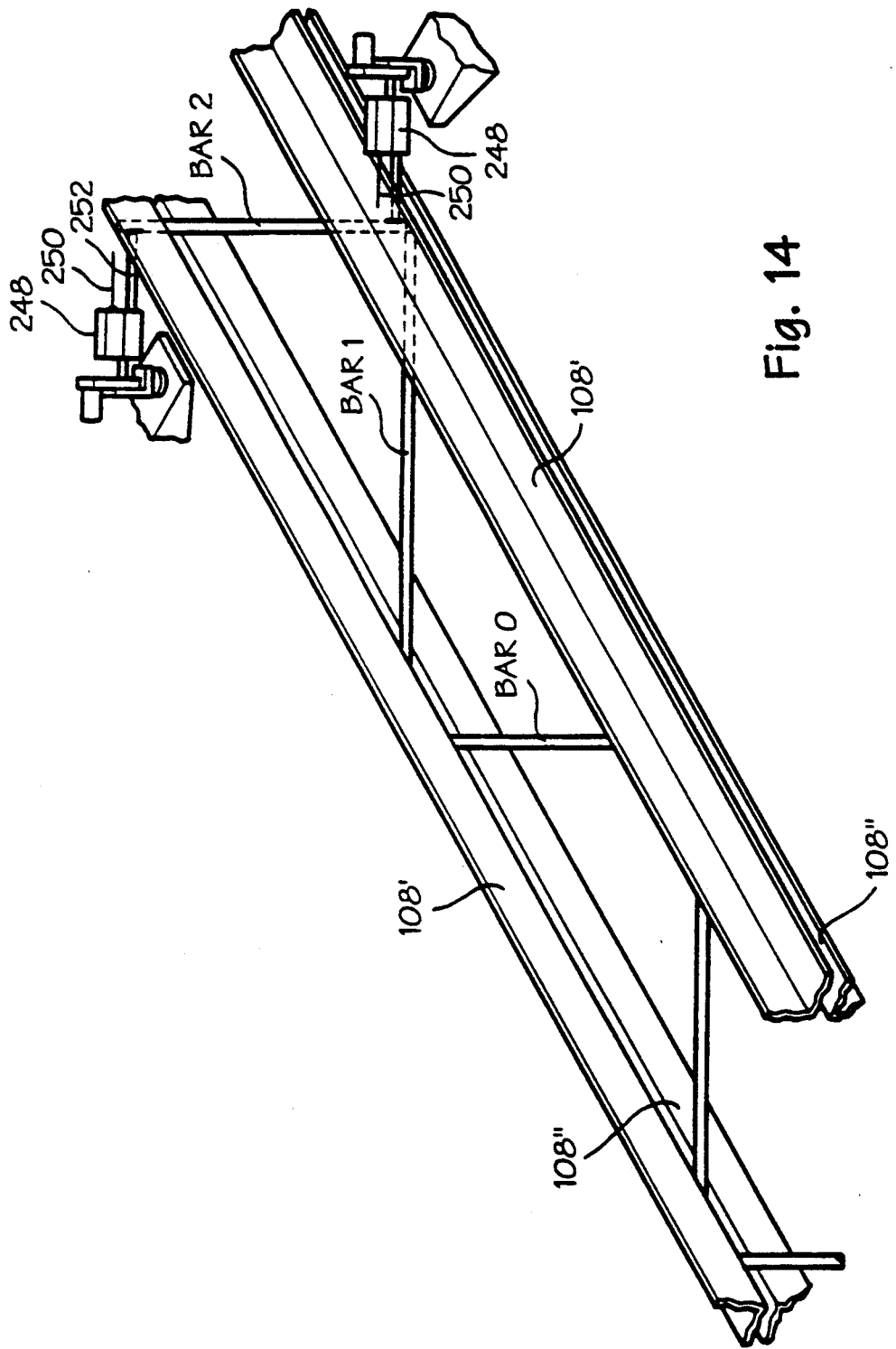
Figure 15:
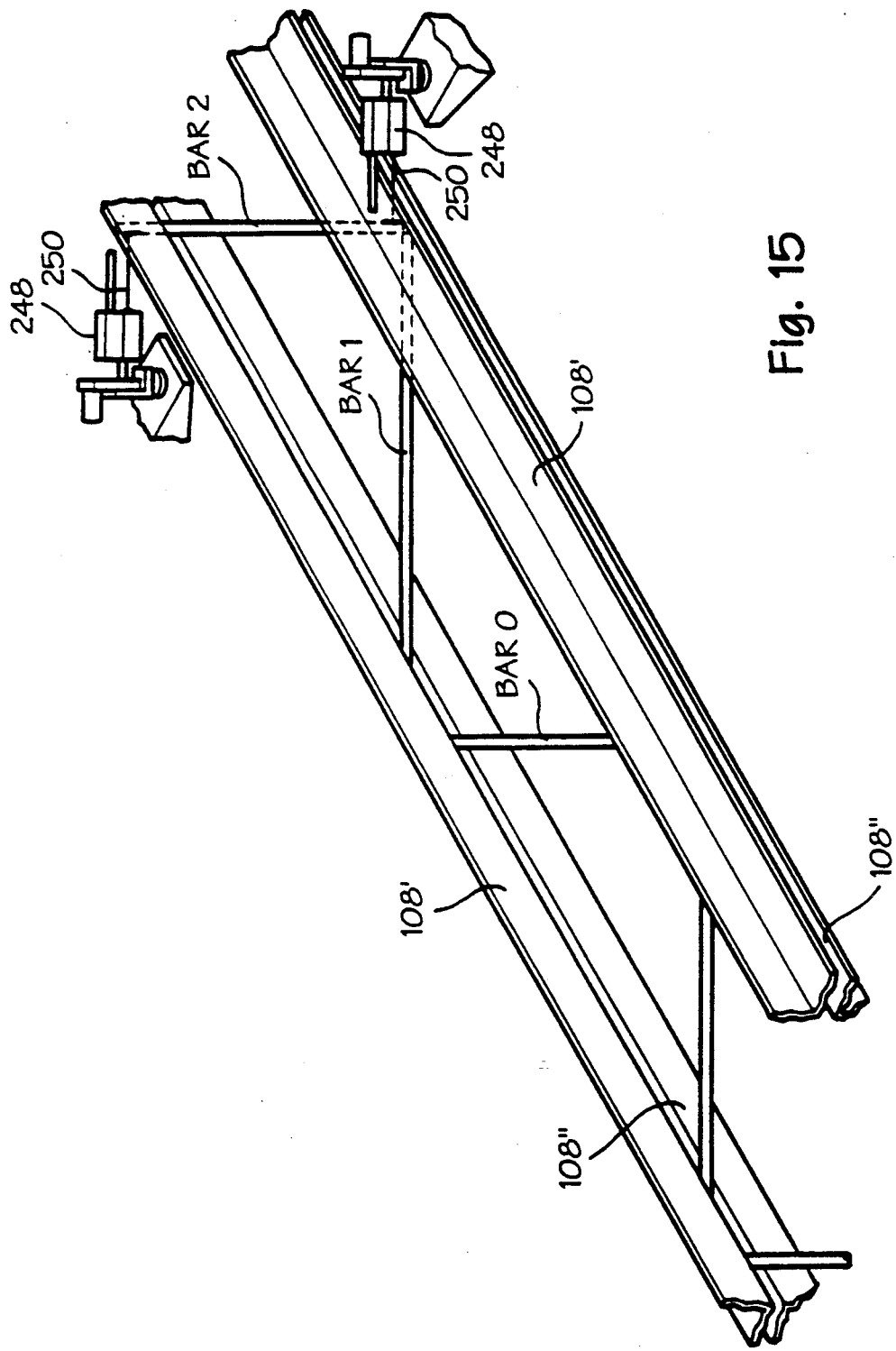
Figure 16:
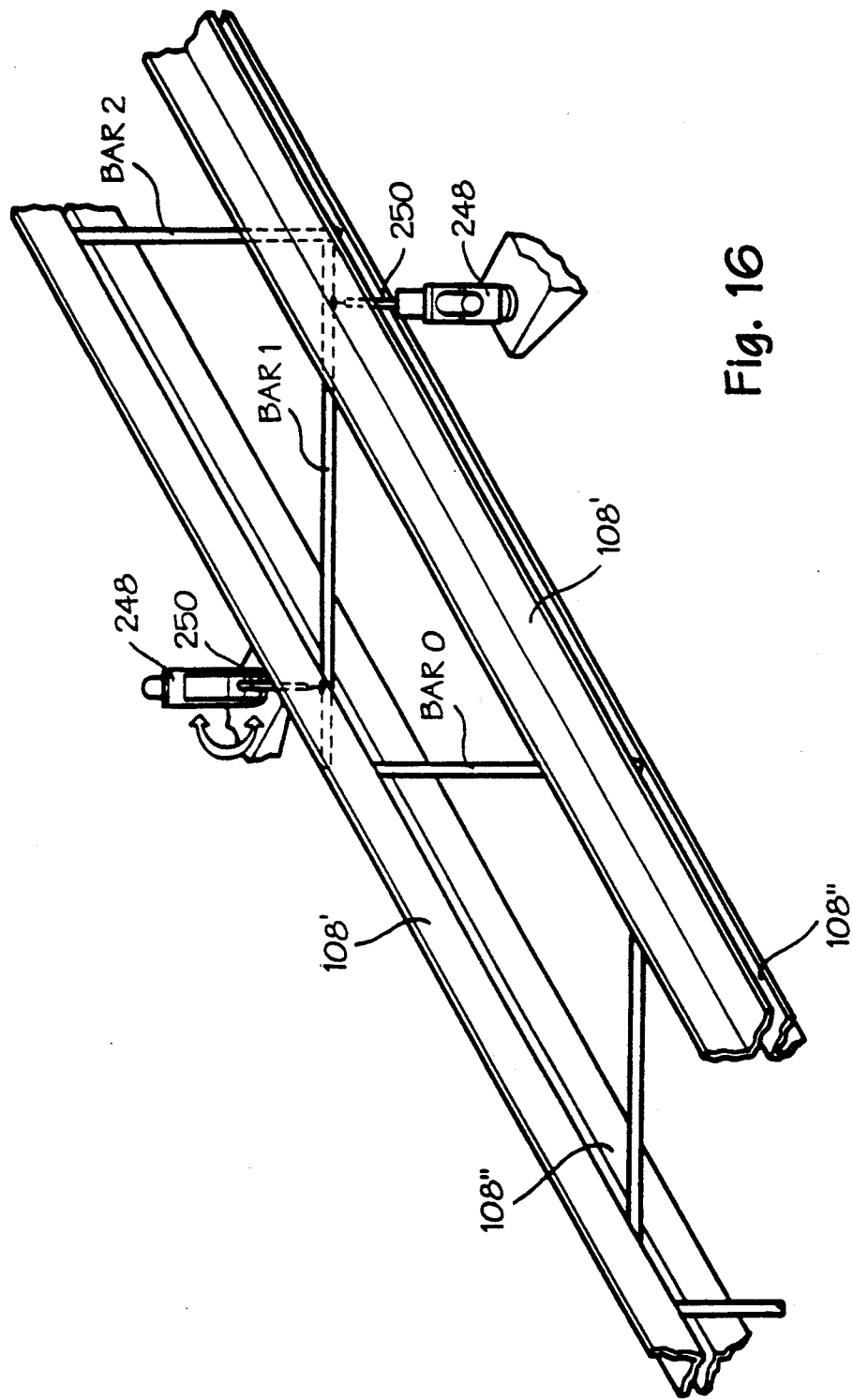

After the welding at BAR 0 has been completed and the welding head 248 withdrawn, the next step in the sequence is to advance the partially made joist by a predetermined length which, again, is controlled by the CPU depending on the design criteria for the particular joist being formed. The partially formed joist is advanced or indexed by operation of the four drive members 122, 134, and this advancement is represented diagrammatically in FIG. 13. After the partially formed joist has been indexed and has come to a stop, the upper angle irons 108' are raised a small distance by the moveable block 174 and the clamping fingers 72, 77 (FIG. 5) as described above, and the next metal bar in the sequence, which is designated as BAR 2 in FIG. 13, is positioned between the two pairs of angle irons in a predetermined angular relationship therebetween by the manipulating and grasping equipment 20, after which the upper angle irons 108' are moved downwardly into abutment with the top surface of BAR 2 and the pressure piston 314 is moved vertically to press the components together, all in the manner described above. It should be noted at this point that the small increment of movement of the upper angle irons 108' does not effect the integrity of the completed weld at the ends of BAR 0 because the increment of vertical movement is small, and the linear spacing between the ends of BAR 0 and the point at which the upper angle irons 108' are raised to receive BAR 2, when combined with the inherent resiliency of the upper angle irons 108', result in the upper angle iron 108' deflecting slightly to accommodate the small increment of vertical movement without affecting the integrity of the welds at BAR 0. On the other hand, as best illustrated in FIG. 20, at the point where upper angle iron 108' is raised to its greatest spacing from lower angle iron 108" to receive the end of the new BAR 2, the adjacent end of BAR 1 is welded only at the top surface thereof to the upper angle iron 108', and it is therefore free to separate temporarily from the lower angle iron 108" when the upper angle iron 108' is raised to receive the end of BAR 2.

Figure 20:
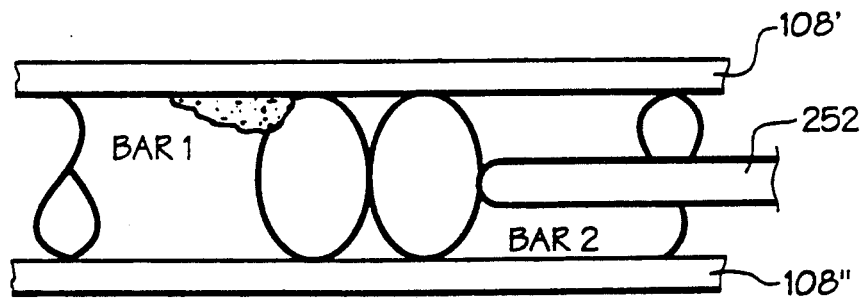
Figure 21:
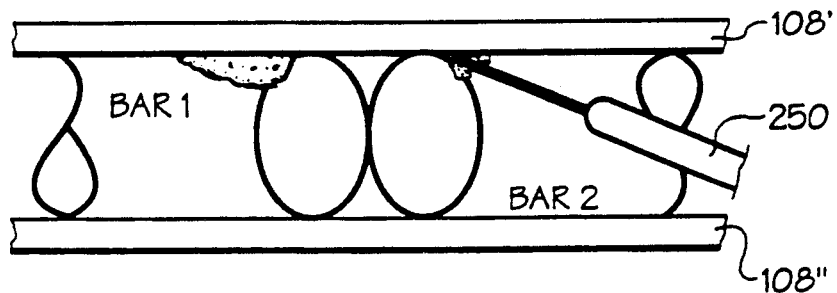
Figure 22:
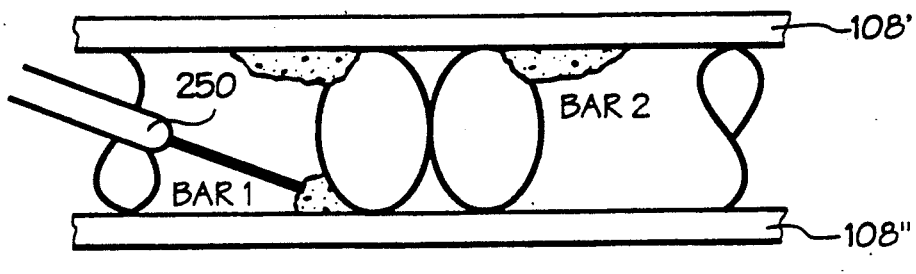

After the ends of BAR 2 are properly positioned between the two pairs of angle irons 108', 108", the next step in the sequence is to sense the end of BAR 2 as shown in FIG. 20, and then weld the top of BAR 2 to the upper angle iron 108' as illustrated in FIG. 21. Next, the welding heads 148 are repositioned by the various motors as described above, and the welding tip 250 is advanced to finish the welding of BAR 1 by welding the bottom surface thereof to the lower angle irons 108". Thereafter, the partially formed joist is again advanced or indexed by a predetermined distance, a new metal bar is positioned between the two pairs of angle irons, and a new sequence of welding begins which repeats the entire sequence described above and illustrated in FIGS. 17–22. This welding sequence is continued until the entire joist is completed. Depending on the design characteristics of the particular joist being made, there may be, and usually are, special variations in the welding sequence which must be applied to particular areas of the joist, such as the leading and trailing end portions of the joist where the metal bars 28 will have a particular disposition with respect to the angle irons that is different from the ordinary web forming metal bars 28, but the CPU is capable of adjusting the welding sequence, where necessary, based on the aforesaid joist design input that is initially fed into the CPU.

Thus, except for the manual loading of the four angle irons into the advancing station 14 and the periodic replenishing of the metal bar stocks at the cutting station 10, the operation of the apparatus of the present invention results in a fully automatic and reliable method of making a joist. Moreover, the apparatus is extremely versatile in terms of the number of different joist designs that can be made because the pairs of angle irons which make up the two chord members can be positioned at a wide range of required spacings, and the individual lengths of metal bars which make up the web can be selected in terms of diameter size and length at the cutting station 10 so that virtually any required design characteristics for the web can be accommodated. Moreover, each of the individually selected metal bar lengths can be properly located with respect to the angle iron chord members in virtually any angular relationship thereto so that, again, a wide range of design characteristics can be easily accommodated. Finally, the precision with which the apparatus of the present invention selects the correct metal bar, both in terms of size and length, and the precision with which the angle iron chord members and the metal bar members are positioned and welded with respect to one another, results in a joist that is extremely reliable in construction.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for making a joist consisting of two spaced chord members interconnected by metal bars forming a web therebetween, said apparatus including:
   (a) means for delivering a plurality of substantially linear metal bars of predetermined length to an assembly station;
   (b) means for delivering two substantially linear chord members of predetermined length to said assembly station, said chord member delivery means including means for positioning said chord members in spaced relation to one another at such assembly station, and means for advancing said chord member through said assembly station;
   (c) means for grasping and manipulating said metal bars individually so that each said metal bar is located between said spaced chord members with each end of each said metal bar being disposed in abutting relationship with a different one of said chord members; and
   (d) welding means for welding said ends of each said individual metal bar to said chord members at the point of abutment therebetween.

2. Apparatus for making joists as defined in claim 1, wherein each said chord member consists of a pair of angle irons, wherein said chord member positioning means positions the angle irons in each said pair with one corresponding flat wall portion thereof arranged in spaced parallel relation to corresponding flat wall portion of the other angle iron in said pair, and wherein said metal bar grasping and manipulating means positions each end of each said metal bar, respectively, between said spaced wall portions of one said pair of angle irons for subsequent welding thereat.

3. Apparatus for making joists as defined in claim 2, wherein said welding means and said grasping and manipulating means are operative in a predetermined sequence such that one of said metal bars is positioned between said spaced wall portion of said pair of angle irons and is welded to only one angle iron on each said pair, then the next metal bar is positioned between said pair of said angle irons by said grasping and manipulating means, and then said one metal bar is welded to the other two angle irons in each said pair.

4. Apparatus for making a joist as defined in claim 1, wherein said apparatus includes forming means for automatically forming said metal bars into said predetermined length, said forming means including feeder means for advancing a stock piece of metal bar beyond a fixed reference point for a distance corresponding to said predetermined length, and cutting means for cutting said stock pieces at said reference point.

5. Apparatus for making a joist as defined in claim 4, wherein said forming means includes a plurality of forming stations, each said station having its own feeder means and cutting means, and each said station being constructed and arranged to feed and cut a stock piece having a different diameter.

6. Apparatus for making a joist as defined in claim 4, wherein said feeder means is adjustable to selectively vary distance by which said stock piece of metal is advanced.

7. Apparatus for making a joist as defined in claim 2, wherein said chord member positioning means engages separately each said angle iron in each said pair, and selectively moves said angle iron in each said pair toward said away from one another between a first position at which the spacing therebetween is greater than the diameter of said metal bar to be positioned therebetween, and a second position at which said angle irons are moved toward one another to press said flat wall portion of said angle iron into firm abutment with one end of said metal bar for subsequent welding thereto by said welding means.

8. Apparatus for making a joist as defined in claim 1, wherein said metal bar grasping and manipulating means includes turret means rotatable about an axis of rotation that is generally perpendicular to the plane containing said chord members, said turret means having arm means for releasably grasping said metal bars, and being rotatable to selectively position said grasped metal bar at any one of a plurality of different angular relationship with respect to said chord members.

9. Apparatus for making a joist as defined in claim 8, wherein said arm means includes a pair of arm members spaced from one another to grasp said metal bar at spaced locations, said arm members being selectively moveable toward and away from one another to permit said arm members to properly hold metal bars of different lengths.

10. Apparatus for making a joist as defined in claim 1, wherein said welding means including a welding tip for forming a weld between said end of said metal bar and one of said chord members, said welding tip being mounted on a mounting means moveable toward and away from end of said metal bar to permit said welding tip to be selectively moved to a position for engaging said end of said metal bar to form said weld and then moved away from said metal bar.

11. Apparatus for making a joist as defined in claim 10, wherein said welding means including position sensor means mounted on said mounting means for movement therewith, said sensor means being moveable with respect to said mounting means toward and away from said end of said metal bar for generating signal which is a function of relative positions said end of said metal bar and said mounting means.

12. A method of making a joist which consists of two spaced chord members interconnected by metal bars forming a web therebetween, said method comprising the steps of:
   (a) arranging two substantially linear chord members at an assembly station in spaced, parallel relation to one another, and moving said chord member in relation to said assembly station in a series of predetermined stepped increments;
   (b) delivering to said assembly station a plurality of substantially linear metal bars, at least some of said metal bars being of different sizes with respect to one another;

(c) manipulating said metal bars in a predetermined sequence so that one said metal bar at a time is located between spaced chord members for each said stepped increment of movement of said chord member, each said metal bar being manipulated to extend between said chord members with the end portions thereof in abutting relationship with said chord members, respectively; and (d) welding said end portions of said metal bar to said chord members after each said stepped increment of movement of said chord members.

13. A method of making a joist as defined in claim 12, wherein each of said chord members consist of a pair of angle irons and said arranging step includes locating each angle iron in each said pair with the flat wall portion thereof disposed in spaced parallel relationship to one another for receiving said ends of said metal bars therebetween.

14. A method of making a joist as defined in claim 13, wherein the two angle irons in each said pair are temporarily moved away from one another after each said stepped increment of movement to increase the spacing between said flat wall portion to a distance greater than the diameter of the metal bar to be disposed therebetween at that stepped increment of movement, and wherein said two angle irons are then moved toward one another after said metal bar has been disposed therebetween to urge said angle irons into positive abutment with said end portions of said metal bar prior to said welding of said end portion to said angle iron.

15. A method of making a joist as defined in claim 14, wherein one angle iron in each said pair are arranged in one common plane, and the other angle iron in each said pair are arranged in another common plane, and wherein both ends of a first metal bar are welded to two angle irons in one common plane, then said pairs of angle irons are moved away from another to receive a second metal rod in said sequence and then moved toward one another to abut said end portions of said metal bars, and wherein both ends of first metal bar are then welded to the angle irons which lie in said other common plane.

16. A method of making a joist as defined in claim 12, wherein said manipulating step includes locating each said metal bar to lie at a preselected angle with respect to said chord members, and in that said angle for at least some of said metal bars is different from said angle of other of said metal bars.

17. A method of making a joist as defined in claim 12, wherein said method includes the steps of maintaining an inventory of stock pieces of said metal bars having different diameters, feeding preselected ones of said stock pieces for a predetermined distance beyond a reference point, and cutting said stock pieces adjacent said reference point to form said metal bars of different sizes.

18. Apparatus for making a joist consisting of two spaced chord members interconnected by metal bars forming a web therebetween, said apparatus comprising:

(a) guide means for movably supporting two pairs of angle irons in spaced relation to one another, and with the two angle irons in each pair having the flat wall portions thereof disposed in spaced parallel relation, said guide means including separating means for selectively increasing and decreasing said spacing between said two angle irons in each said pair, and said guide means including advancing means for simultaneously moving said two pairs of angle irons through an assembly station in stepped increments of predetermined lengths;

(b) delivery means for delivering a plurality of substantially linear metal bars of predetermined length to said assembly station, the length of at least some of said metal bars being different from those of other of said metal bars, and said delivery means delivering said metal bars of different lengths in a predetermined order;

(c) manipulating means for individually grasping said metal bars in a predetermined sequence so that one said metal bar at a time is positioned to extend between said pairs of angle irons at a predetermined angle with respect thereto and with the opposite ends of each said metal bar being disposed between said two angle irons of each said pair, respectively, said positioning of one said metal bar occurring each time said separating means operates to increase said spacing between said two angle irons in each pair; and (d) welding means located at said assembly station for welding said metal bars to said angle irons.

19. Apparatus for making a joist as defined in claim 18, wherein said guide means, said manipulating means, said welding means, said advancing means, and said delivery means operate in a predetermined order in which the upper surfaces at the ends of one metal bar are welded, respectively, to one of said angle irons in each said pair, then the lower surfaces at the ends of the immediately preceding metal bar in said sequence are welded, respectively, to the other of said angle irons in each said pair, then the angle irons are advanced in one of said stepped increments by said advancing means, then the spacing between the angle irons in each said pair is increased by said separating means to receive therebetween a subsequent metal bar delivered by said delivery means, then operating said welding means to weld the upper surfaces of the ends of said subsequent metal bar to said one angle iron in each said pair, and then operating said welding means to weld the lower surfaces of the ends of said one metal bar to said other angle iron in each said pair.

20. A method of making a joist which consists of two spaced chord members interconnected by metal bars forming a web therebetween, said method comprising the steps of:

(a) arranging two substantially linear chord members at an assembly station in spaced, parallel relation to one another, and causing said chord members to be moved through said assembly station along a predetermined path of movement and at a predetermined rate of speed;

(b) delivering to said assembly station a plurality of substantially linear metal bars, at least some of said metal bars being of different sizes with respect to one another;

(c) manipulating said metal bars in a predetermined sequence so that said metal bars are located between spaced chord members, said manipulating of said metal bars being coordinated with said movement of said chord members through said assembly station to cause each said metal bar to be disposed between said chord members with the end portions thereof in abutting relationship with said chord members, respectively; and (d) welding said end portions of each said metal bar to said chord members.

21. A method of making a joist as defined in claim 20, wherein each of said chord members consist of a pair of angle irons and said arranging step includes locating each angle iron in each said pair with the flat wall portion thereof disposed in spaced parallel relationship to one another for receiving said ends of said metal bars therebetween.

22. A method of making a joist as defined in claim 21, wherein the two angle irons in each said pair are temporarily moved away from one another after each said stepped increment of movement to increase the spacing between said flat wall portion to a distance greater than the diameter of the metal bar to be disposed therebetween at that stepped increment of movement, and wherein said two angle irons are then moved toward one another after said metal bar has been disposed therebetween to urge said angle irons into positive abutment with said end portions of said metal bar prior to said welding of said end portion to said angle iron.

23. A method of making a joist as defined in claim 22, wherein one angle iron in each said pair are arranged in one common plane, and the other angle iron in each said pair are arranged in another common plane, and wherein both ends of a first metal bar are welded to two angle irons in one common plane, then said pairs of angle irons are moved away from another to receive a second metal rod in said sequence and then moved toward one another to abut said end portions of said metal bars, and wherein both ends of first metal bar are then welded to the angle irons which lie in said other common plane.

24. A method of making a joist as defined in claim 20, wherein said manipulating step includes locating each said metal bar to lie at a preselected angle with respect to said chord members, and in that said angle for at least some of said metal bars is different from said angle of other of said metal bars.

25. A method of making a joist as defined in claim 20, wherein said method includes the steps of maintaining an inventory of stock pieces of said metal bars having different diameters, feeding preselected ones of said stock pieces for a predetermined distance beyond a reference point, and cutting said stock pieces adjacent said reference point to form said metal bars of different sizes.

* * * * *